(12) United States Patent
Khalil et al.

(10) Patent No.: US 11,079,141 B2
(45) Date of Patent: Aug. 3, 2021

(54) CONTROLLED LIQUID/SOLID MOBILITY USING EXTERNAL FIELDS ON LUBRICANT-IMPREGNATED SURFACES

(71) Applicant: Massachusetts Institute of Technology, Cambridge, MA (US)

(72) Inventors: Karim Samir Khalil, Boston, MA (US); Kripa K. Varanasi, Lexington, MA (US); Seyed Reza Mahmoudi, Waltham, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 0 days.

(21) Appl. No.: 15/956,128

(22) Filed: Apr. 18, 2018

(65) Prior Publication Data

US 2019/0096555 A1    Mar. 28, 2019

Related U.S. Application Data

(63) Continuation of application No. 14/576,879, filed on Dec. 19, 2014, now abandoned.
(Continued)

(51) Int. Cl.
*F24S 40/42* (2018.01)
*B01L 3/00* (2006.01)
(Continued)

(52) U.S. Cl.
CPC ......... *F24S 40/42* (2018.05); *B01L 3/502707* (2013.01); *B01L 3/502792* (2013.01);
(Continued)

(58) Field of Classification Search
CPC .. F24S 40/42; F24S 40/20; F24S 10/70; F24T 10/13; F28F 13/04; F28F 19/00;
(Continued)

(56) References Cited

U.S. PATENT DOCUMENTS 4,069,933 A   1/1978  Newing
4,125,152 A   11/1978 Kestner et al.
(Continued)

FOREIGN PATENT DOCUMENTS

CN   100344341 C   10/2007
CN   101269960 B    5/2011
(Continued)

OTHER PUBLICATIONS

Sushant Anand et al, "Enhanced Condensation on Lubricant-Impregnated Nanotextured Surfaces", Department of Mechanical Engineering, Massachusetts Institute of Technology, Cambridge, Massachusetts, published Oct. 2, 2012. (Year: 2012).*
(Continued)

*Primary Examiner* — Joseph W Drodge
(74) *Attorney, Agent, or Firm* — Wolf, Greenfield & Sacks, P.C.

(57) ABSTRACT

A method for precise control of movement of a motive phase on a lubricant-impregnated surface includes providing a lubricant-impregnated surface, introducing the motive phase onto the lubricant-impregnated surface, and exposing the droplets to an electric and/or magnetic field to induce controlled movement of the droplets on the surface. The lubricant-impregnated surface includes a matrix of solid features spaced sufficiently close to stably contain the impregnating lubricant therebetween or therewithin. The motive phase is immiscible or scarcely miscible with the impregnating lubricant.

26 Claims, 13 Drawing Sheets

Related U.S. Application Data

(60) Provisional application No. 61/919,481, filed on Dec. 20, 2013.

(51) Int. Cl.
| | | |
|---|---|---|
| *B64D 15/06* | (2006.01) | |
| *C09D 5/23* | (2006.01) | |
| *F28F 13/04* | (2006.01) | |
| *F28F 19/00* | (2006.01) | |
| *C09D 5/16* | (2006.01) | |
| *F24S 40/20* | (2018.01) | |
| *C09D 5/24* | (2006.01) | |
| *F04B 19/00* | (2006.01) | |
| *H01F 1/44* | (2006.01) | |
| *F24S 10/70* | (2018.01) | |
| *F24T 10/13* | (2018.01) | |
| *F28F 13/16* | (2006.01) | |
| *C09D 5/00* | (2006.01) | |

(52) U.S. Cl.
CPC ............. *B64D 15/06* (2013.01); *C09D 5/00* (2013.01); *C09D 5/1681* (2013.01); *C09D 5/1687* (2013.01); *C09D 5/23* (2013.01); *C09D 5/24* (2013.01); *F04B 19/006* (2013.01); *F24S 10/70* (2018.05); *F24S 40/20* (2018.05); *F24T 10/13* (2018.05); *F28F 13/04* (2013.01); *F28F 19/00* (2013.01); *H01F 1/442* (2013.01); *H01F 1/445* (2013.01); *B01L 2300/0816* (2013.01); *B01L 2300/161* (2013.01); *B01L 2300/166* (2013.01); *B01L 2400/043* (2013.01); *B01L 2400/0415* (2013.01); *F28F 13/16* (2013.01); *Y02E 10/40* (2013.01); *Y10T 137/0391* (2015.04); *Y10T 428/13* (2015.01)

(58) Field of Classification Search
CPC ............. F28F 13/16; B01L 3/502707; B01L 3/502792; B01L 2300/0816; B01L 2300/161; B01L 2300/166; B01L 2400/0415; B01L 2400/043; B64D 15/06; C09D 5/1687; C09D 5/24; C09D 5/1681; C09D 5/23; C09D 5/00; F04B 19/006; F04B 39/02; H01F 1/442; H01F 1/445; H01F 1/44; Y02E 10/40; Y02E 10/10; Y02E 10/44; Y10T 428/13; Y10T 137/0391; F24J 2/461; F24J 2/4618
USPC ..... 210/695, 696; 417/48, 50; 204/155, 450, 204/451
See application file for complete search history.

(56) References Cited

U.S. PATENT DOCUMENTS

| | | | |
|---|---|---|---|
| 4,204,021 A | 5/1980 | Becker | |
| 4,316,745 A | 2/1982 | Blount | |
| 4,503,099 A | 3/1985 | Chang et al. | |
| 5,624,713 A | 4/1997 | Ramer | |
| 5,853,802 A | 12/1998 | Boyer et al. | |
| 6,216,472 B1 | 4/2001 | Cathenaut et al. | |
| 6,346,180 B1* | 2/2002 | Gonzalez | B03C 1/32 204/557 |
| 7,323,221 B2 | 1/2008 | Heppekausen et al. | |
| 7,458,384 B1 | 12/2008 | Seal et al. | |
| 7,622,197 B2 | 11/2009 | Balow et al. | |
| 7,722,951 B2 | 5/2010 | Li et al. | |
| 7,887,934 B2 | 2/2011 | Gentleman et al. | |
| 7,892,660 B2 | 2/2011 | Gentleman et al. | |
| 7,897,271 B2 | 3/2011 | Gentleman et al. | |
| 7,901,798 B2 | 3/2011 | Gentleman et al. | |
| 7,977,267 B2 | 7/2011 | Gentleman et al. | |
| 8,057,922 B2 | 11/2011 | Gentleman et al. | |
| 8,057,923 B2 | 11/2011 | Gentleman et al. | |
| 8,062,775 B2 | 11/2011 | Gentleman et al. | |
| 8,173,279 B2 | 5/2012 | Gentleman et al. | |
| 8,178,219 B2 | 5/2012 | Gentleman et al. | |
| 8,222,172 B2 | 7/2012 | Gentleman et al. | |
| 8,235,096 B1 | 8/2012 | Mahefkey et al. | |
| 8,236,432 B2 | 8/2012 | Gentleman et al. | |
| 8,252,259 B2 | 8/2012 | Seal et al. | |
| 8,574,704 B2 | 11/2013 | Smith et al. | |
| 9,272,292 B1* | 3/2016 | Munson | C10G 32/02 |
| 9,625,075 B2* | 4/2017 | Smith | F16L 55/00 |
| 2002/0164443 A1 | 11/2002 | Oles et al. | |
| 2003/0092172 A1* | 5/2003 | Oh | B01L 3/502738 435/287.2 |
| 2003/0096083 A1 | 5/2003 | Morgan et al. | |
| 2003/0134035 A1 | 7/2003 | Lamb et al. | |
| 2003/0166470 A1* | 9/2003 | Fripp | F15B 20/002 507/100 |
| 2004/0026832 A1 | 2/2004 | Gier et al. | |
| 2004/0037961 A1 | 2/2004 | Dieleman et al. | |
| 2004/0173422 A1 | 9/2004 | Deshmukh et al. | |
| 2004/0219373 A1 | 11/2004 | Deruelle et al. | |
| 2005/0003146 A1 | 1/2005 | Spath | |
| 2005/0016489 A1 | 1/2005 | Endicott et al. | |
| 2005/0112326 A1 | 5/2005 | Nun et al. | |
| 2005/0136217 A1 | 6/2005 | Barthlott et al. | |
| 2005/0208272 A1 | 9/2005 | Groll | |
| 2006/0013735 A1 | 1/2006 | Engelking et al. | |
| 2006/0078724 A1 | 4/2006 | Bhushan et al. | |
| 2006/0147675 A1 | 7/2006 | Nun et al. | |
| 2006/0204738 A1 | 9/2006 | Dubrow et al. | |
| 2006/0246226 A1 | 11/2006 | Dai et al. | |
| 2007/0031639 A1 | 2/2007 | Hsu et al. | |
| 2007/0144976 A1* | 6/2007 | Franzreb | B01L 3/502761 210/695 |
| 2007/0207335 A1 | 9/2007 | Karandikar et al. | |
| 2007/0282247 A1 | 12/2007 | Desai et al. | |
| 2007/0298216 A1 | 12/2007 | Jing et al. | |
| 2008/0085070 A1 | 4/2008 | Hirata et al. | |
| 2008/0118763 A1 | 5/2008 | Balow et al. | |
| 2008/0213461 A1 | 9/2008 | Gill et al. | |
| 2008/0213853 A1* | 9/2008 | Garcia | B01L 3/0268 435/173.1 |
| 2008/0225378 A1 | 9/2008 | Weikert et al. | |
| 2009/0078614 A1* | 3/2009 | Varghese | B03C 1/0332 209/39 |
| 2009/0155609 A1 | 6/2009 | Gentleman et al. | |
| 2009/0191594 A1 | 7/2009 | Ohashi | |
| 2009/0211735 A1 | 8/2009 | Stenkamp et al. | |
| 2009/0231273 A1 | 9/2009 | Lashina et al. | |
| 2010/0028604 A1 | 2/2010 | Bhushan et al. | |
| 2010/0092621 A1 | 4/2010 | Akutsu et al. | |
| 2010/0098909 A1 | 4/2010 | Reyssat et al. | |
| 2010/0112286 A1 | 5/2010 | Bahadur et al. | |
| 2010/0147441 A1 | 6/2010 | Nakagawa et al. | |
| 2010/0200094 A1 | 8/2010 | Ermakov | |
| 2010/0285229 A1 | 11/2010 | Elbahri et al. | |
| 2010/0285275 A1 | 11/2010 | Baca et al. | |
| 2010/0297733 A1* | 11/2010 | Lin | B03C 1/288 435/239 |
| 2010/0307922 A1 | 12/2010 | Wu | |
| 2011/0077172 A1 | 3/2011 | Aizenberg et al. | |
| 2011/0106504 A1 | 5/2011 | Noureldin | |
| 2011/0201984 A1 | 8/2011 | Dubrow et al. | |
| 2011/0212163 A1* | 9/2011 | Hoare | A61P 35/00 424/450 |
| 2011/0226998 A1 | 9/2011 | Van De Weijer-Wagemans et al. | |
| 2011/0283778 A1 | 11/2011 | Angelescu et al. | |
| 2011/0287217 A1 | 11/2011 | Mazumder et al. | |
| 2012/0036846 A1 | 2/2012 | Aizenberg et al. | |
| 2012/0128963 A1 | 5/2012 | Mao et al. | |
| 2012/0251521 A1* | 10/2012 | Rostra | A61P 31/12 424/125 |
| 2013/0003258 A1 | 1/2013 | Xie et al. | |
| 2013/0032316 A1 | 2/2013 | Dhiman et al. | |
| 2013/0034695 A1 | 2/2013 | Smith et al. | |

(56) References Cited

U.S. PATENT DOCUMENTS

| | | | |
|---|---|---|---|
| 2013/0062285 A1 | 3/2013 | Hoek et al. | |
| 2013/0062286 A1* | 3/2013 | Ruiz Hitzky | C09C 1/24 |
| | | | 210/660 |
| 2013/0146536 A1 | 6/2013 | Tarabara et al. | |
| 2013/0220813 A1 | 8/2013 | Anand et al. | |
| 2013/0251769 A1 | 9/2013 | Smith et al. | |
| 2013/0251942 A1 | 9/2013 | Azimi et al. | |
| 2013/0251946 A1* | 9/2013 | Azimi | C04B 41/81 |
| | | | 428/142 |
| 2013/0251952 A1 | 9/2013 | Smith et al. | |
| 2013/0333789 A1* | 12/2013 | Smith | F16L 55/00 |
| | | | 138/145 |
| 2013/0335697 A1 | 12/2013 | Smith et al. | |
| 2013/0337027 A1 | 12/2013 | Smith et al. | |
| 2014/0178611 A1 | 6/2014 | Smith et al. | |
| 2014/0291420 A1 | 10/2014 | Dhiman et al. | |

FOREIGN PATENT DOCUMENTS

| | | |
|---|---|---|
| DE | 198 18 956 A1 | 11/1998 |
| JP | H01170392 A | 7/1989 |
| JP | H05240251 A | 9/1993 |
| JP | 2004-037764 A | 5/2004 |
| JP | 2008-240910 A | 10/2008 |
| TW | I 233 968 B | 6/2005 |
| WO | WO 93/017077 A1 | 9/1993 |
| WO | WO 99/036490 A1 | 7/1999 |
| WO | WO 02/062568 A2 | 8/2002 |
| WO | WO 03/071275 A1 | 8/2003 |
| WO | WO 2006/017009 A2 | 2/2006 |
| WO | WO 2006/091235 A1 | 8/2006 |
| WO | WO 2007/019362 A1 | 2/2007 |
| WO | WO 2008/111603 A1 | 9/2008 |
| WO | WO 2009/009185 A2 | 1/2009 |
| WO | WO 2010/028752 A1 | 3/2010 |
| WO | WO 2010/082710 A1 | 7/2010 |
| WO | WO 2010/096073 A1 | 8/2010 |
| WO | WO 2010/129807 A1 | 11/2010 |
| WO | WO 2011/087458 A1 | 7/2011 |
| WO | WO 2011/143371 A1 | 11/2011 |
| WO | WO 2012/024099 A1 | 2/2012 |
| WO | WO 2012/100099 A2 | 7/2012 |
| WO | WO 2012/100100 A2 | 7/2012 |
| WO | WO 2013/022467 A2 | 2/2013 |
| WO | WO 2013/130118 A1 | 9/2013 |
| WO | WO 2013/141888 A1 | 9/2013 |
| WO | WO 2013/141953 A2 | 9/2013 |
| WO | WO 2013/177579 A2 | 11/2013 |

OTHER PUBLICATIONS

Svetlanda Boriskina et al, "Plasmonic materials for energy: from physics to applications", Department of Mechanical Engineering, Massachusetts Institute of Technology, Cambridge, Massachusetts, published 2013. (Year: 2013).*
On-line internet article entitled "MIT researchers develop surface coatings to inhibit buildup of methane hydrates that can block deep-sea oil and gas pipelines", "https://www.greencarcongress.com/2012/04/varansi-20120411 .html", published Apr. 11, 2012. (Year: 2012).*
International Search Report for International Application No. PCT/US2011/061498 dated Jul. 31, 2012.
International Preliminary Report on Patentability for International Application No. PCT/US2011/061498 dated Feb. 13, 2014.
International Search Report and Written Opinion for International Application No. PCT/US2011/061898 dated Apr. 24, 2013.
International Preliminary Report on Patentability for International Application No. PCT/US2011/061898 dated Feb. 20, 2014.
International Search Report and Written Opinion for International Application No. PCT/US2012/030370 dated Oct. 15, 2012.
International Preliminary Report on Patentability for International Application No. PCT/US2012/030370 dated Oct. 2, 2014.
International Search Report and Written Opinion for International Application No. PCT/US2012/042326 dated Dec. 3, 2012.
International Preliminary Report on Patentability for International Application No. PCT/US2012/042326 dated Oct. 2, 2014.
International Search Report and Written Opinion for International Application No. PCT/US2012/042327 dated May 16, 2013.
International Preliminary Report on Patentability for International Application No. PCT/US2012/042327 dated Sep. 12, 2014.
International Search Report and Written Opinion for International Application No. PCT/US2012/065627 dated Mar. 8, 2013.
International Preliminary Report on Patentability for International Application No. PCT/US2012/065627 dated May 30, 2014.
International Search Report and Written Opinion for International Application No. PCT/US2013/028439 dated Dec. 5, 2013.
International Preliminary Report on Patentability for International Application No. PCT/US2013/028439 dated Sep. 12, 2014.
International Search Report and Written Opinion for International Application No. PCT/US2013/042771 dated May 26, 2014.
International Preliminary Report on Patentability for International Application No. PCT/US2013/042771 dated Dec. 4, 2014.
International Search Report and Written Opinion for International Application No. PCT/US2013/045731 dated Nov. 12, 2013.
International Preliminary Report on Patentability for International Application No. PCT/US2013/045731 dated Dec. 24, 2014.
International Search Report and Written Opinion for International Application No. PCT/US2013/070827 dated Mar. 27, 2014.
International Preliminary Report on Patentability for International Application No. PCT/US2013/070827 dated Mar. 19, 2015.
International Search Report and Written Opinion for International Application No. PCT/US2014/071410 dated Mar. 18, 2015.
International Preliminary Report on Patentability for International Application No. PCT/US2014/071410 dated Jun. 30, 2016.
[No Author], 3M Corporation. Fluorinert Liquids For Electronics Manufacturing. 3M Electronic Materials 2003, pp. 1-4.
[No Author], Simplekids Crafts. How to make a magnetic boat? 1 page (2009).
Allain et al., A new method for contact-angle measurements of sessile drops. Journal of Calloid and Interface Science. vol. 107, No. 1, Sep. 1985, 9 pages.
Anand et al., Enhanced condensation on lubricant-impregnated nanotextured surfaces. ACS Nano. Nov. 27, 2012;6(11):10122-9. doi: 10.1021/nn303867y. Epub Oct. 10, 2012.
Antonini et al., Water drops dancing on ice: how sublimation leads to drop rebound. Phys Rev Lett. Jul. 5, 2013;111(1):014501. Epub Jul. 2, 2013.
Arkles. Hydrophobicity, Hydrophilicity and Silanes. Paint and Coatings Industry. Oct. 1, 2006, 10 pages.
Ashkin et al., Optical levitation by radiation pressure. Applied Physics Letters. 19(8):283-285 (1971).
Ashkin et al., Optical levitation of liquid drops by radiation pressure. Science. 187(4181):1073-1075 (1975).
Avedisian et al., Leidenfrost boiling of methanol droplets on hot porous/ceramic surfaces. International Journal of Heat and Mass Transfer. 30(2):379-393 (1987).
Bargir et al., The use of contact angle measurements to estimate the adhesion propensity of calcium carbonate to solid substrates in water. Applied Surface Science 255:4873-4879 (2009).
Baier et al., Propulsion mechanisms for Leidenfrost solids on ratchet surfaces. arXiv preprint arXiv:1208.5721 (2012).
Baier et al., Propulsion mechanisms for Leidenfrost solids on ratchets. Phys Rev E Stat Nonlin Soft Matter Phys. Feb. 2013;87(2):021001. Epub Feb. 21, 2013.
Barnes. The potential for monolayers to reduce the evaporation of water from large water storages. Agricultural Water Management. 95, 4:339-353, (2008).
Bauer et al., The insect-trapping rim of *Nepenthes* pitchers: surface structure and function. Plant Signaling & Behavior. 4 (11): 1019-1023 (2009).
Beaugnon et al., Dynamics of magnetically levitated droplets. Physica B: Condensed Matter. 294-295:715-720 (2001).
Betz et al., Do surfaces with mixed hydrophilic and hydrophobic areas enhance pool boiling? Applied Physics Letters. 97:141909 p. 1-3, (2010).

(56) References Cited

OTHER PUBLICATIONS

Biance et al., Leidenfrost drops. Physics of Fluids. 15(6):1632-1637 (2003).
Bico et al., Pearl drops. Europhysics Letters. 47(2):220-226 (1999).
Bird et al, Reducing the contact time of a bouncing drop. Nature. 503:385 (2013).
Blossey. Self-cleaning surfaces—virtual realities. Nat Mater. May 2003;2(5):301-6.
Bohn et al., Insect aquaplaning: *Nepenthes* pitcher plants capture prey with the peristome, a fully wettable water-lubricated anisotropic surface. PNAS.14138-14143 (2004).
Burton et al., Geometry of the Vapor Layer Under a Leidenfrost drop. Physical Review Letters. 109(7):074301 (2012).
Cao et al., Anti-Icing superhydrophobic coatings. Langmuir Letter. 2009, A-E.
Cassie et al., Wettability of porous surfaces. Transactions of the Faraday Society. 40: 546-551, (1944).
Celestin et al., Take off of small Leidenfrost droplets. Phys. Rev. Lett. 109(3):034501 (2012).
Chandra et al., Leidenfrost evaporation of liquid nitrogen droplets. Transactions—ASME: Journal of Heat Transfer. 116(4):999-1006 (1994).
Chandra et al., Observations of droplet impingement on a ceramic porous surface. International Journal of Heat and Mass Transfer 35(10):2377-2388 (1992).
Chen et al., A wettability switchable surface by microscale surface morphology change. Journal of Micromechanics & Microengineering. Institute of Physics Publishing. 17(3): 489-195 (2007).
Cummings et al., Oscillations of magnetically levitated aspherical droplets. J. Fluid Mech. 224:395-416 (1991).
Deng et al., Nonwetting of impinging droplets on textured surfaces. Appl. Phys. Lett. 94(13):133109 (2009).
Elbahri et al., Anti-lotus effect for nanostructuring at the Leidenfrost temperature. Advanced Materials. 19(9):1262-1266 (2007).
Feng et al., Design and creation of superwetting/antiwetting surfaces. Advanced Materials. 18(23):3063-3078 (2006).
Fondecave et al., Polymers as dewetting agents. Marcomolecules 31:9305-9315 (1998).
Fujimoto et al., Deformation and rebounding processes of a water droplet impinging on a flat surface above Leidenfrost temperature. Journal of Fluids Engineering. Transactions of the ASME. 118(1):142-149 (1996).
Furmidge. Studies at phase interfaces. I. The sliding of liquid drops on solid surfaces and a theory for spray retention. J. Colloid Sci. 1962, 17: 309-324.
Gao et al., Artificial lotus leaf prepared using a 1945 patent and a commercial textile. Langmuir. 22(14):5998-6000 (2006).
Goldshtik et al., A liquid drop on an air cushion as an analogue of Leidenfrost boiling. Journal of Fluid Mechanics. 166:1-20 (1986).
Gradeck et al., Heat transfer for Leidenfrost drops bouncing onto a hot surface. Experimental Thermal and Fluid Science. 47:14-25 (2013).
Hashmi et al., Leidenfrost levitation: Beyond droplets. Scientific Reports. 2:797:1-4 (2012).
Hejazi et al., Wetting Transitions in Two-, Three-, and Four-Phase Systems. Langmuir. 28:2173-2180 (2012).
Holden et al., The use of organic coatings to promote dropwise condensation of steam. Journal of Heat Transfer. 109: 768-774 (1987).
Iwasa et al., 'Electromaglev'—Magnetic levitation of a superconducting disc with a DC field generated by electromagnets: Part 1. Theoretical and experimental results on operating modes, lift-to-weight ratio, and suspension stiffness. Cryogenics. 37(12):807-816, (1997).
Jung et al., Are superhydrophobic surfaces Best for icephobicity? Langmuir. 27(6):3059-3066 (2011).
Kazi et al., Mineral scale formation and mitigation on metals and a polymeric heat exchanger surface. Applied Thermal Engineering. 30:2236-2242 (2010).
Kim et al., Hierarchical or not? Effect of the length scale and hierarchy of the surface roughness on omniphobicity of lubricant-infused substrates. Nano Letters. 13(4):1793-1799 (2013).
Kim et al., Levitation time measurement of water drops on the surface of liquid nitrogen. Journal of the Korean Physical Society. vol. 58, No. 6, pp. 1628-1632 (Jun. 2011).
Kim. Floating phenomenon of a water drop on the surface of liquid nitrogen. Journal of the Korean Physical Society. vol. 49, No. 4, pp. L1335-L1338 (Oct. 2006).
Kulinich et al., Ice adhesion on super-hydrophobic surfaces. Applied Surface Science. 2009, 225: 8153-8157.
Lafuma et al., Slippery pre-suffused surfaces. EPL 96: 56001-p1-56001-p4 (2011).
Lagubeau et al., Leidenfrost on a ratchet. Nature Physics. 7(5):395-398 (2011).
Lee et al., Dynamic wetting and spreading characteristics of a liquid droplet impinging on hydrophobic textured surfaces. Langmuir. 27:6565-6573 (2011).
Leidenfrost. On the fixation of water in diverse fire. International Journal of Heat and Mass Transfer. 9(11):1153-1166 (1966).
Li et al., Dynamic behavior of the water droplet impact on a textured hydrophobic/ superhydrophobic surface: The effect of the remaining liquid film arising on the pillars' tops on the contact time. Langmuir. 26(7):4831-4838, (2010).
Linke et al., Self-propelled Leidenfrost droplets. Physical Review Letters. 96(15) (2006).
Liu et al., Metallic surfaces with special wettability. Nanoscale. 3:825-238 (2011).
Marin et al., Capillary droplets on Leidenfrost micro-ratchets. arXiv preprint arXiv:1210.4978 (2012).
Meuler et al., Exploiting topographical texture to impact icephobicity. ACS Nano. 2010, 4(12): 7048-7052.
Mills, Pillow lavas and the Leidenfrost effect. Journal of the Geological Society. 1984;141:183-6.
Mishchenko et al., Design of ice-free nanostructured surfaces based on repulsion of impacting water droplets. ACS Nano. 4(12):7699-7707 (2010).
Onda et al., Super-water-repellent fractal surfaces. Langmuir. 12(9) (1996).
Ou et al., Laminar drag reduction in microchannels using ultrahydrophobic surfaces. Physics of Fluids. 16(12):4635-4643 (2004).
Park et al., A numerical study of the effects of superhydrophobic surface on skin-friction drag in turbulent channel flow. Phys. Fluids. 25, 110815 (2013).
Piroird et al., Magnetic control of Leidenfrost drops. Physical Review E—Statistical, Nonlinear, and Soft Matter Physics. 85(5) (2012).
Pozzato et al., Superhydrophobic surfaces fabricated by nanoimprint lithography. Microelectronic Engineering. 83:884-888 (2006).
Prat et al., On the effect of surface roughness on the vapor flow under Leidenfrost-Levitated droplets. Journal of Fluids Engineering. Transactions of the ASME. 117(3):519-525 (1995).
Quéré et al., Surfing the hot spot. Nature Materials. 5(6):429-430 (2006).
Quéré . Leidenfrost dynamics. Annu. Rev. Fluid Mech. 197-215 (2013).
Quéré . Non-sticking drops. Institute of Physics Publishing, Rep. Prog. Phys. 68(11):2495-2532 (2005).
Rausch et al., On the characteristics of ion implanted metallic surfaces inducing dropwise condensation of steam. Langmuir. 26(8): 5971-5975 (2010).
Reyssat et al., Dynamical superhydrophobicity. Faraday Discussions. 146:19-33 (2010).
Reyssat et al., Bouncing transitions on microtextured materials. Europhysics Letters. 74(2):306-312 (2006).
Richard et al., Contact time of a bouncing drop. Nature. 417:(6891):811 (2002).
Roosen et al., Optical levitation by means of two horizontal laser beams: a theoretical and experimental study. Physics Letters A. 59(1):6-8 (1976).
Rothstein. Slip on superhydrophobic surfaces. ANRV400-FL42-05. ARI. 89-109 (2010).

(56) References Cited

OTHER PUBLICATIONS

Rykaczewski et al., Mechanism of Frost Formation of Lubricant-Impregnated Surfaces. Langmuir 2013, 29 5230-5238, 13 pages.
Santos et al., Modified Stainless Steel Surfaces Targeted to Reduce Fouling. J. Food Engineering. 64:63-79 (2004).
Seiwert et al., Coating of a textured solid. J. Fluid Mech. 2011, 669: 55-63.
Sekeroglu et al., Transport of a soft cargo on a nanoscale ratchet. Appl Phys Lett. Aug. 8, 2011;99(6):63703-637033. Epub Aug. 12, 2011.
Smith et al., Droplet mobility on lubricant-impregnated surfaces. Soft Matter. 2012(9): 1772-1780 (2012).
Smith et al., Liquid-encapsulating surfaces: overcoming the limitations of superhydrophobic surfaces for robust non-wetting and anti-icing surfaces. Bulletin of the American Physical Society. (2011). Abstract Only.
Snoeijer et al., Maximum size of drops levitated by an air cushion. Physical Review E—Statistical, Nonlinear, and Soft Matter Physics. 79(3) (2009).
Song et al., Superhydrophobic surfaces produced by applying a self-assembled monolayer to silicon micro/nano-textured surfaces. Nano Research. 2009, 2: 143-150.
Song et al., Vitrification and levitation of a liquid droplet on liquid nitrogen. PNAS Early Edition. pp. 1-5 (2010).
Trinh et al., The dynamics of ultrasonically levitated drops in an electric field. Physics of Fluids. 8(1):43-61 (1996).
Tuteja et al., Designing superoleophobic surfaces. Science. 318(5856):1618-1622 (2007).
Tuteja et al., Robust omniphobic surfaces. PNAS. 105(47):18200-18205 (2008).
Vakarelski et al., Drag reduction by Leidenfrost vapor layers. Physical Review Letters. 106(21) (2011).
Vakarelski et al., Stabilization of Leidenfrost vapour layer by textured superhydrophobic surfaces. Nature. 489(7415):274-277 (2012).
Varanasi et al., Frost formation and ice adhesion on superhydrophobic surfaces. Applied Phys Lett. 2010;97(23):234102.
Varanasi et al., Spatial control in the heterogeneous nucleation of water. Applied Physics Letters. 95: 094101-01-03 (2009).
Weber et al., Aero-acoustic levitation: A method for containerless liquid-phase processing at high temperatures. Review of Scientific Instruments. 65(2):456-465 (1994).
Weickgenannt et al., Inverse-Leidenfrost phenomenon on nanofiber mats on hot surfaces. Physical Review E—Statistical, Nonlinear, and Soft Matter Physics. 84(3) (2011).
Weilert et al., Magnetic levitation and noncoalescence of liquid helium. Physical Review Letters. 77(23):4840-4843 (1996).
Welter et al., Acoustically levitated droplets—A new tool for micro and trace analysis. Fresenius' Journal of Analytical Chemistry, 357(3):345-350 (1997).
Wenzel. Resistance of solid surfaces to wetting by water. Industrial & Engineering Chemistry. 28(8): 988-994 (1936).
Wong et al., Bioinspired self-repairing slippery surfaces with pressure-stable omniphobicity. Nature. 477(7365):443-447 (2011).
Würger. Leidenfrost gas ratchets driven by thermal creep. Phys. Rev. Lett. 107(16) (2011).
Yarin et al., On the acoustic levitation of droplets. J. Fluid Mech. 356:65-91 (1998).
Yasuda et al., Levitation of metallic melt by using the simultaneous imposition of the alternating and the static magnetic fields. Journal of Crystal Growth. 260(3-4):475-485 (2004).
Yu et al., Containerless solidification of oxide material using an electrostatic levitation furnace in microgravity. Journal of Crystal Growth. 231(4):568-576 (2001).
Xue et al., Magnetic liquid marbles: A "precise" miniature reactor. Adv. Mater. 22(43):4814-4818 (2010).
Zhao et al., Dropwise condensation of Steam on Ion Implanted Condenser Surfaces. Heat Recovery Systems & CHP. 14(5): 525-534 (1994).

* cited by examiner

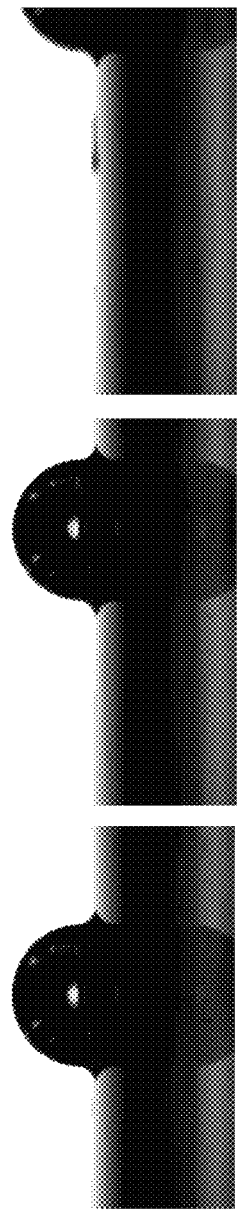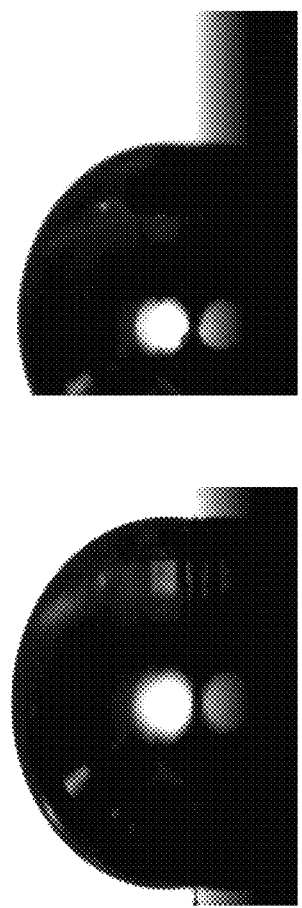
FIG. 5(a)
FIG. 5(b)

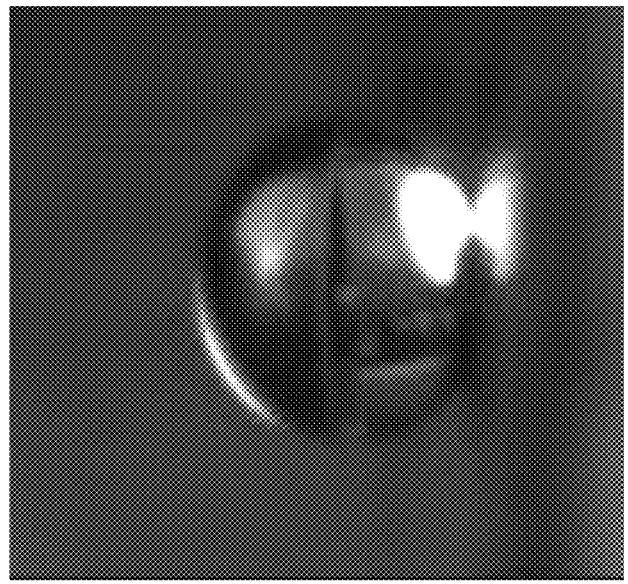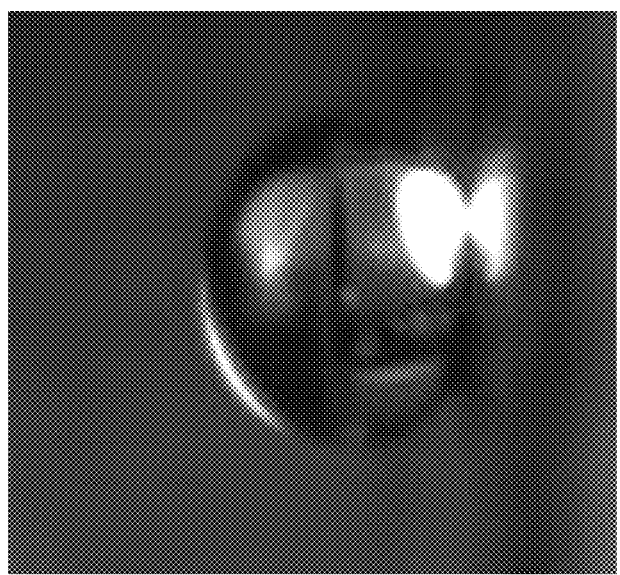
FIG. 7

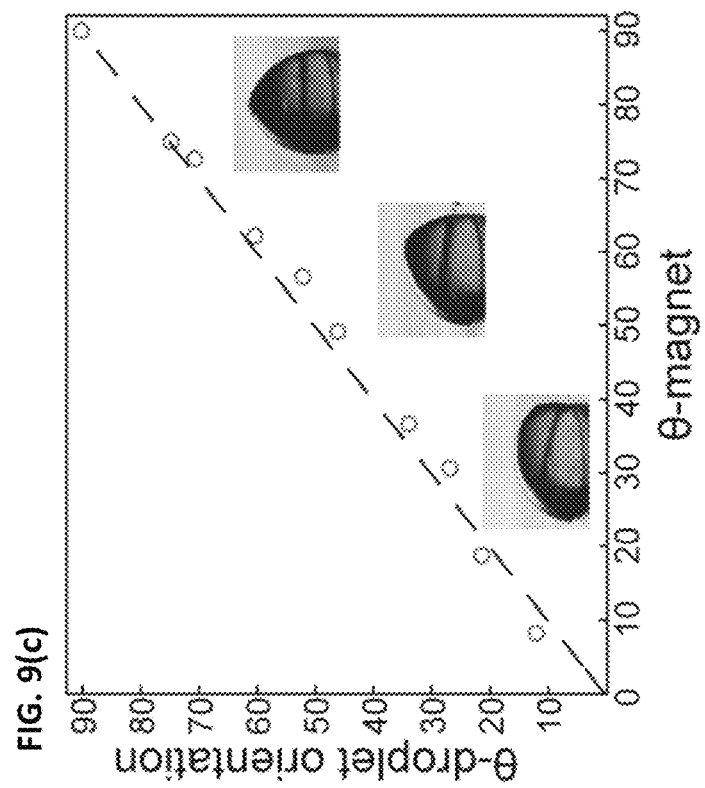
FIG. 9(b)
FIG. 9(c)
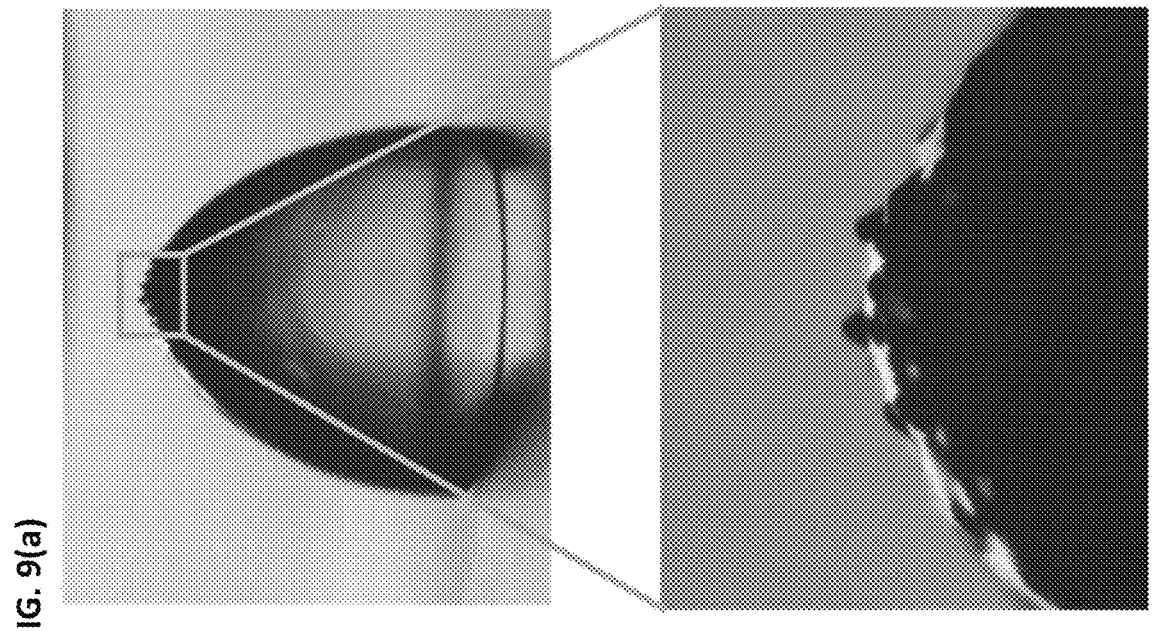
FIG. 9(a)

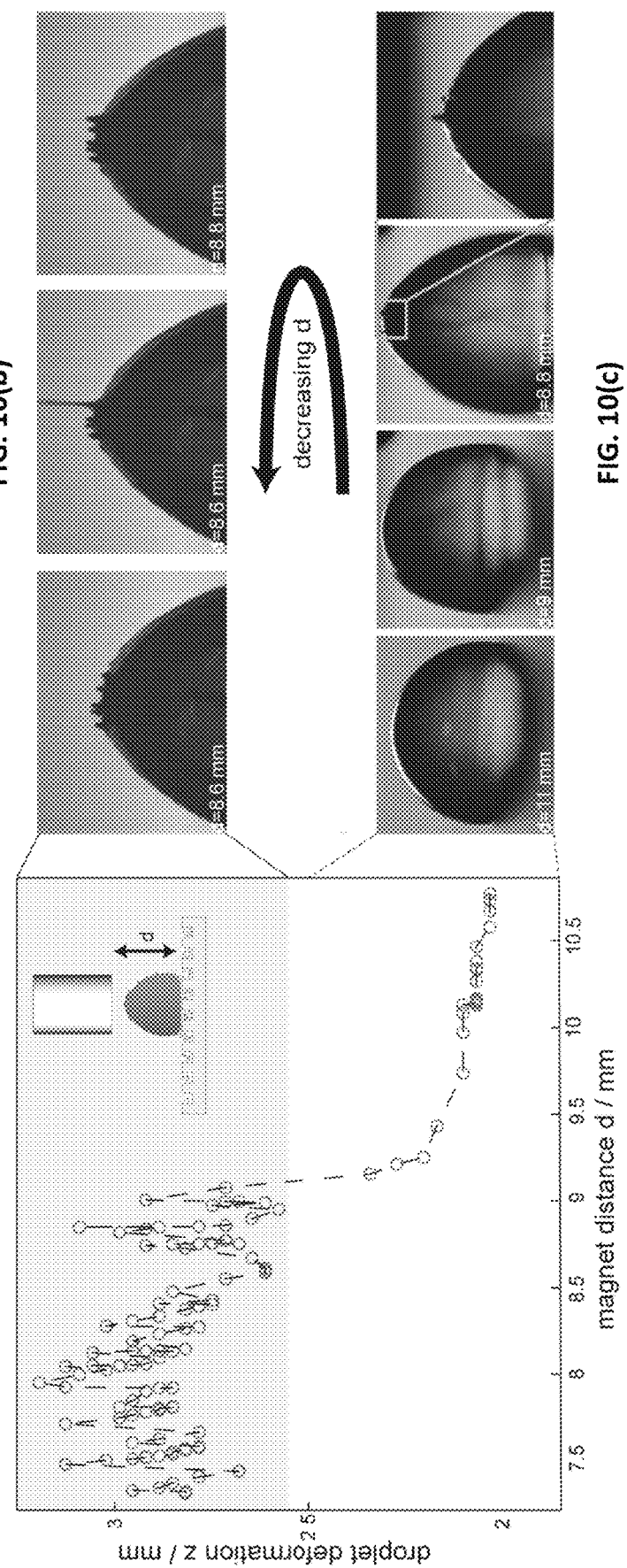

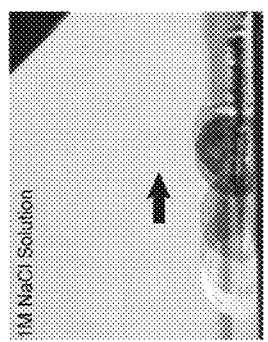
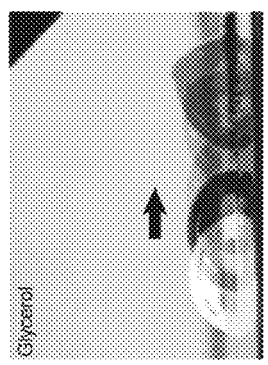
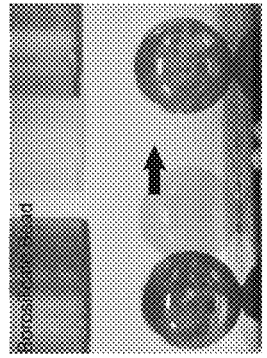
FIG. 11(b)
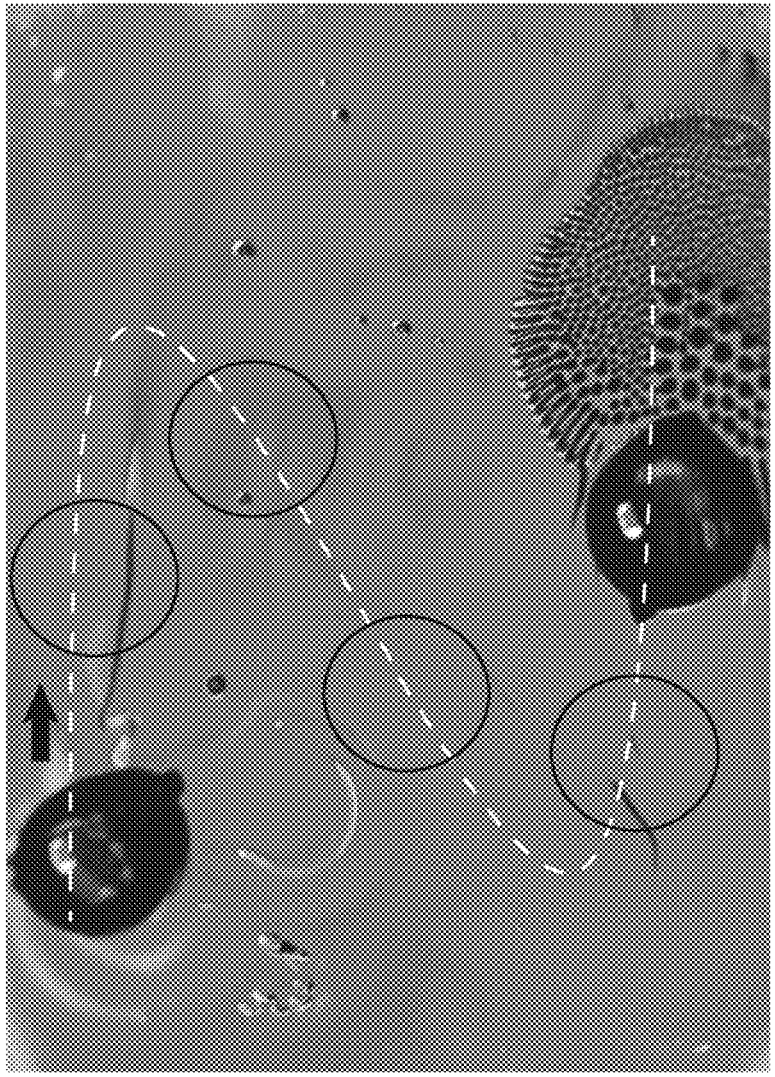
FIG. 11(c)

CONTROLLED LIQUID/SOLID MOBILITY USING EXTERNAL FIELDS ON LUBRICANT-IMPREGNATED SURFACES

CROSS-REFERENCE TO RELATED APPLICATIONS

This application is a continuation of U.S. application Ser. No. 14/576,879, filed Dec. 19, 2014, entitled "Controlled Liquid/Solid Mobility Using External Fields On Lubricant-Impregnated Surfaces", which claims priority under 35 U.S.C. § 119(e) to U.S. Provisional Patent Application No. 61/919,481, filed Dec. 20, 2013, each of which is incorporated herein by reference in their entirety for all purposes.

TECHNICAL FIELD

This invention relates generally to articles, devices, and methods for controlling the movement of liquids and solids on lubricant-impregnated surfaces.

BACKGROUND

The ability to control the movement of motive phases (e.g., droplets) on surfaces (e.g., non-wetting surfaces) is highly desirable for a wide variety of diverse applications including, for example, micro-fluidic devices, anti-icing, dropwise condensation, and biomedical devices. For example, conventional lab-on-a-chip (LOC) devices integrate one or more laboratory functions on a single, small chip and are useful in performing diagnostic tests. These devices permit the handling of very small fluid volumes, e.g., volumes of a picoliter or less, via prefabricated microchannels that constrain the pathways for moving droplets containing materials of interest, such as biological cells, proteins, suspended particles, or other biological materials. However, these microchannels, once etched, cannot be modified, thereby limiting how the chip can be used (e.g., the trajectories of movement are limited by the shape of the etched microchannels). Furthermore, physical and chemical effects such as capillary forces, surface roughness, and interference of surface materials in the chemical or biological reactions taking place can become more dominant on a small scale, and may interfere with the desired functionality of the chip and resulting in low signal-to-noise ratios The ability to control the movement of motive phases (e.g., droplets) is important in a wide variety of applications, including applications where icing is a concern (and where anti-icing properties need to be imparted), as well as applications where hydrate formation and/or scale buildup is a concern. The ability to control movement of motive phases is also important in applications involving condensate formation (e.g., to shed condensate from a surface in a controlled manner or to control where condensate that forms is directed to). The ability to control the movement of motive phases is also important in applications involving moving and/or control of particles, emulsified phases, complex fluids (e.g., blood, crude oil, waxes, foams, Non-Newtonian/Newtonian fluids), semi-solids (e.g., greases, metallic liquids, magnetic/non-magnetic fluids, ER/MR fluids, colloidal fluids, multiphase systems, etc., and any combination thereof), Bio-films/Bio-fouling, low surface tension fluids (e.g., liquefied natural gas, alcohols, pentane, refrigerant fluids, alkanes).

Certain conventional methods relate to the use of active external fields to manipulate the movement of liquid droplets, for example, via the use of electric, acoustic, and vibrational forces. Nonetheless, moving viscous and/or highly conductive fluids remains a significant challenge.

Certain conventional methods relate to manipulating the movement of liquid droplets on surfaces by embedding complex electrode geometries into the surfaces of interest. These conventional methods typically use AC voltages that depend on the applied frequency, which significantly limits the applicability of these methods. Moreover, these conventional methods generally can control the movement of only certain types of liquids on the surface, which further limits the applicability of conventional methods. Moreover, conventional systems and methods require frequent and costly maintenance, which is undesirable.

Implementations of systems and methods with the ability to precisely control movement of droplets on surfaces have encountered significant obstacles, including droplet adhesion on such surfaces. Therefore, improved systems and methods for eliminating or significantly reducing droplet adhesion on the surface are needed. Particularly desirable are systems and methods for precise control of fluids (e.g., droplets) on free surfaces, e.g., surfaces that do not include prefabricated channels or embedded circuitry.

SUMMARY OF THE INVENTION

Described herein, in certain embodiments, are systems and methods for controlling/manipulating the movement of droplets (e.g., liquid droplets) on surfaces (e.g., non-wetting surfaces). In some embodiments, the droplets move over a lubricant-impregnated surface, which enhances or improves the slippage of droplets. An external electrical and/or magnetic field is applied to a lubricant-impregnated surface, thereby optimizing energy transfer and allowing precise control of the movement of a motive phase(s) (e.g., liquid droplets) on the surface (including, e.g., precise control of the trajectory and/or the speed of the movement of the motive phase). In certain embodiments, the invention facilitates shedding of both moisture and dust from critical energy system surfaces. In some embodiments, critical energy system surfaces include condenser surfaces (shedding small droplets instead of allowing filmwise condensation to occur), solar panels (droplets/dust will cause light diffraction and decrease efficiency of panel dramatically). Both of these are "energy systems", both of which need droplets to be shed.

Described herein, in certain embodiments, are active surfaces for controlling the mobility of droplets, as well as associated methods. In some embodiments, the surface includes an impregnating substance that is stably impregnated into the surface. In some embodiments, the impregnating substance is an impregnating liquid. In some embodiments, the impregnating substance is a ferrofluid. In some embodiments, the active surface is textured. In some embodiments, droplets on ferrofluid-impregnated surface have extremely low hysteresis and high mobility such that they can be propelled by applying relatively low magnetic fields, as discussed below. In some embodiments, the articles and methods discussed herein may be used for manipulating the movement of a variety of materials, including, but not limited to, diamagnetic, conductive, highly viscous fluids, as well as solid particles.

Liquid-impregnated surfaces, as well as methods for making the same, and devices incorporating the same are discussed, for example, in U.S. Non-Provisional patent application Ser. No. 13/302,356, filed Nov. 22, 2011; U.S. Non-Provisional patent application Ser. No. 14/084,126, filed Nov. 19, 2013, and International Application No.

PCT/US13/70827, filed Nov. 19, 2013, the disclosures of each of which are incorporated herein by reference in their entireties.

In certain embodiments, the lubricant that impregnates the surface also cloaks (e.g., forms a thin film over) droplets (e.g., water droplets) that encounter the surface. The droplet-cloaking lubricant may contain magnetic nanoparticles that collect or otherwise concentrate on the surface of the droplet, thereby facilitating the controlled movement of droplets upon application of a magnetic field, for example. In some embodiments, the magnetic nanoparticles migrate towards a region where the magnetic field is applied (e.g., where the magnet is positioned), causing the motive phase (e.g., liquid droplet) to translate in that direction. A variety of different factors may be adjusted to precisely control the trajectory and the speed of the movement of the motive phase; these factors include strength of the applied magnetic field, concentration and type of magnetic particles dispersed in the lubricant, surface roughness, as well as other factors.

Certain embodiments of the present invention may be used with droplets that contain and/or encapsulate a wide variety of substances, or combinations/mixtures of different substances. Some embodiments of the systems and methods described herein may be used for creation of self-cleaning systems appropriate for long-term use with significantly reduced (or eliminated) maintenance requirements (e.g., reducing maintenance from daily or weekly maintenance to e.g., monthly, bi-monthly, or yearly maintenance).

According to certain embodiments, the lubricant-impregnated surface may be impregnated with a wide range of different lubricants, including liquid and non-liquid lubricants.

In certain embodiments, the lubricant has an extremely low vapor pressure, which helps eliminate the concern of lubricant loss through evaporation. Suitable examples of lubricants with extremely low vapor pressures include, for example, ionic liquids, such as 1-butyl-3-methylimidazolium bis(trifluoromethylsulfonyl) imide (BMIm) which has a vapor pressure on the order of $\sim 10^{-12}$ mmHg. In certain embodiments, lubricants having any vapor pressure may be chosen. In embodiments where evaporation of lubricant is a concern, a system for automatic replenishment of the lubricant may be constructed. In some embodiments, the replenishing system includes a reservoir including the lubricant, which is automatically replenished or replenished based upon a predetermined triggering condition (e.g., if the amount of the lubricant drops below a certain predetermined threshold).

One aspect disclosed herein relates to a method for controlling movement of a motive phase (e.g., liquid droplets, liquids, solids, semi-solids, films) on a liquid-impregnated surface. The method includes providing a liquid-impregnated surface, said surface comprising an impregnating liquid and a matrix of solid features spaced sufficiently close to contain (e.g., stably contain) the impregnating liquid therebetween or therewithin; introducing the motive phase onto the surface (e.g., wherein introducing the motive phase (e.g., liquid droplets) onto the surface comprises allowing the motive phase (e.g., liquid droplets) to form on the surface, e.g., via condensation), the motive phase comprising (or consisting essentially of) a phase that is immiscible with (or only scarcely miscible with) the impregnating liquid; and exposing the motive phase to an electric field and/or a magnetic field to induce controlled movement of the motive phase on the surface.

Another aspect disclosed herein relates to an article including a liquid-impregnated surface. The liquid impregnated surface includes an impregnating liquid and a matrix of solid features spaced sufficiently close to stably contain the impregnating liquid therebetween or therewithin, wherein the impregnating liquid includes a ferrofluid. The ferrofluid is configured to induce controlled movement of a motive phase introduced on the surface when the motive phase is exposed to a magnetic field.

In some embodiments, the method also includes applying a non-uniform electric field (e.g., above the corona discharge threshold or below the corona discharge threshold) (e.g., via one or more electrodes positioned near, on, or otherwise in relation to the surface) to induce the controlled movement of the motive phase on the surface (e.g., via electrophoretic force or dielectrophoretic force). In some embodiments, the method further includes applying a non-uniform magnetic field (e.g., via one or more magnets positioned near, on, or otherwise in relation to, the surface) to induce the controlled movement of the motive phase (e.g., water) on the surface (e.g., wherein the impregnating liquid comprises magnetic material—e.g., magnetic nanoparticles) and wherein the liquid droplets are cloaked by the impregnating liquid.

Yet another aspect disclosed herein relates to an article including a liquid-impregnated surface. The liquid impregnated surface includes an impregnating liquid and a matrix of solid features spaced sufficiently close to stably contain the impregnating liquid therebetween or therewithin. The impregnating liquid is configured to induce controlled movement of a motive phase introduced on the surface when the motive phase is exposed to an electric field and/or a magnetic field.

In some embodiments, the article is a member selected from the group consisting of a pipeline, a steam turbine part, a gas turbine part, an aircraft part, a wind turbine part, eyeglasses, a mirror, a power transmission line, a container, a windshield, an engine part, a nozzle, a tube, or a portion or coating thereof.

In some embodiments, the impregnating liquid includes (but is not limited to) a member selected from the group consisting of silicone oil, a perfluorocarbon liquid, a perfluoro fluorinated vacuum oil, a fluorinated coolant, an ionic liquid, a fluorinated ionic liquid that is immiscible with water, a silicone oil comprising PDMS, a fluorinated silicone oil, a liquid metal, an electro-rheological fluid, a magneto-rheological fluid, a ferrofluid, a dielectric liquid, a hydrocarbon liquid, a fluorocarbon liquid, a refrigerant, a vacuum oil, a phase-change material, a semi-liquid, grease, synovial fluid, bodily fluid, or any combination thereof.

In some embodiments, the motive phase is or includes liquid droplets (e.g., water droplets). In some embodiments, the liquid-impregnated surface is a surface of a condenser, wherein the liquid droplets include a condensing liquid, and wherein the controlled movement of the liquid droplets on the surface enhances shedding of the condensing liquid, thereby enhancing efficiency of heat transfer provided by the condenser.

In some embodiments, the liquid-impregnated surface is a surface of a solar panel, wherein the motive phase includes dust particles, and wherein the controlled movement of the motive phase on the surface effectively removes the dust particles from the solar panel. In some embodiments, the solar panel self-generates (e.g., by collecting energy from the sun) sufficient energy to provide the electric field (e.g., there is no need for an external power source to control the movement of the motive phase on the lubricant-impregnated surface) to induce controlled movement of the motive phase on the surface.

In some embodiments, the motive phase includes biological material (e.g., DNA encapsulated within the droplets). In some embodiments, the motive phase is ice and exposing the ice to the electric and/or the magnetic field induces controlled movement of the ice on the surface (e.g., induces the ice to move off the surface or to a desired collection location on the surface) to de-ice the surface.

In some embodiments, the surface is a surface of a vessel (e.g., pipe, underwater pipeline) and the motive phase is oil or gas in contact with the surface (e.g., the oil or gas is transported via the pipe). In some embodiments, exposing the oil or gas to the electric and/or the magnetic field induces the oil or gas to move in a controlled manner (e.g., steady speed, trajectory) and/or to prevent buildup of the oil or gas on the surface of the vessel.

In some embodiments, exposing the motive phase to the electric and/or the magnetic field induces inhibition of hydrate adhesion upon the surface. In some embodiments, exposing the motive phase to the electric and/or the magnetic field includes reducing an amount of scale buildup formed on the surface (e.g., where the surface is a surface of a condenser or a heat exchanger). In some embodiments, exposing the motive phase to the electric and/or the magnetic field induces the motive phase (e.g., biological material) to move to a desired location (e.g., for reaction with other biological material, flow cytometry, lab-on-a-chip application).

In some embodiments, the liquid-impregnated surface is a microchannel of an electro hydrodynamic (EHD) pump.

In some embodiments, $\phi=0$, where $\phi$ is a representative fraction of the projected surface area of the liquid-impregnated surface corresponding to non-submerged solid at equilibrium (e.g., all solid features are submerged by impregnating liquid). In some embodiments, one or both of the following holds: (i) $0<\phi\leq0.25$, where $\phi$ is a representative fraction of the projected surface area of the liquid-impregnated surface corresponding to non-submerged solid at equilibrium; and (ii) $S_{ow(a)}<0$, where $S_{ow(a)}$ is spreading coefficient, defined as $\gamma_{wa}-\gamma_{wo}-\gamma_{oa}$, where $\gamma$ is the interfacial tension between the two phases designated by subscripts w, a, and o, where w is the liquid of the liquid droplets (e.g., water), a is surrounding gas (e.g., air), and o is the impregnating liquid (e.g., oil).

In some embodiments, the lubricant entirely cloaks the motive phase. In some embodiments, the lubricant at least partially cloaks the motive phase (e.g., cloaks between 0.5-1%, 1-5%, 5-10%, 1-10%, 10-20%, 1-20%, 20-50%, 1-50%, 50-80%, 80-90%, 1-90% of the motive phase surface). In some embodiments, the lubricant does not cloak the motive phase. In some embodiments, the lubricant forms pulled-up regions around the motive phase to induce movement of the motive phase (e.g., liquid, solid). In some embodiments, the supply of the impregnating liquid may be replenished (e.g., at predetermined intervals, continuously, or when the impregnating liquid level falls below a predetermined threshold).

In some embodiments, the surface is microtextured. In some embodiments, the solid features comprise at least one member selected from the group consisting of a polymeric solid, a ceramic solid, a fluorinated solid, an intermetallic solid, and a composite solid. In some embodiments, the solid features comprise a chemically modified surface, coated surface, surface with a bonded monolayer. In some embodiments, the solid features comprise at least one member selected from the group consisting of posts, nanoneedles, nanograss, substantially spherical particles, and amorphous particles.

Elements of embodiments described with respect to a given aspect of the invention may be used in various embodiments of another aspect of the invention. For example, it is contemplated that features of dependent claims depending from one independent claim can be used in apparatus and/or methods of any of the other independent claims.

BRIEF DESCRIPTION OF THE DRAWINGS

The objects and features of the invention can be better understood with reference to the drawings described below, and the claims.

FIG. 5(a) illustrates a mobile droplet under a non-uniform electric field, where the motion is caused by an electrophoretic force.

FIG. 5(b) illustrates a mobile droplet under a non-uniform electric field, where the motion is caused by an electrophoretic force.

FIG. 7 illustrates a droplet that is unable to translate (move) on a superhydrophobic surface using a tilted electrode setup. The droplet slightly deforms upwards.

FIG. 8(a) illustrates a surface schematic of a surface with a water droplet resting on top of it. FIG. 8(b) is a photograph of a water droplet resting on the surface. FIG. 8(c) illustrates water droplet position versus time in a mobility experiment. FIG. 8(d) illustrates a microscope image of a droplet drifting on a surface. FIG. 8(e) illustrates photographs of a droplet mobility experiment as the water droplet is accelerated towards a magnet.

FIGS. 9(a)-(c) illustrate an embodiment of the present invention where magnetic particles are shown clustering over a cloaked water droplet and orienting themselves to be positioned directly underneath the region of highest magnetic field intensity. FIG. 9(a) illustrates a water droplet with a cylindrical magnet positioned directly overhead; magnetic particles gather at the top of the droplet. FIG. 9(b) illustrates a schematic where a magnet is approached to a water droplet at angle $\theta_{magnet}$ causing the water droplet to deform by angle $\theta_{dropletorientation}$. FIG. 9(c) is a graph illustrating the correlation between the droplet deformation angle and the magnet angle. As seen from the graph in FIG. 9(c), the droplet deformation angle is nearly the same as the magnet angle, which further illustrates that the direction and manner—including the precise angle—of movement of droplets may be precisely controlled using embodiments of the present invention. The magnetic particles clumped at the top of the droplet act to deform the droplet directly in the direction of highest field intensity, or directly at the angle that the magnet is being approached to the droplet.

FIGS. 10(a)-(c) illustrate jetting transition of a ferrofluid-cloaked droplet, according to some embodiments of the present invention. FIG. 10(a) illustrates a graph of droplet height δ versus the distance of the surface of the droplet from the magnet, d. The height of the droplet δ continuously increases until a critical jetting transition distance is reached. Once the critical jetting transition distance is reached, the height of the droplet δ begins to oscillate as fluid jets grow and detach repeatedly from cloak/air interface. FIG. 10(b) illustrates a series of high-speed images of fluid jet detaching from cloak/air interface in the jetting regime. FIG. 10(c) includes snapshots of droplet deformation as the magnet is slowly approached to the surface of the droplet.

FIG. 11(b) illustrates the behavior of droplets of various fluids and one solid that are actuated and displaced when a permanent magnet is approached to the surface, according to some embodiments of the present invention.

FIG. 11(c) shows images of a water droplet being controllably moved along an s-curve as the magnet is held beneath the surface, according to some embodiments of the present invention.

DESCRIPTION

Figure 1:
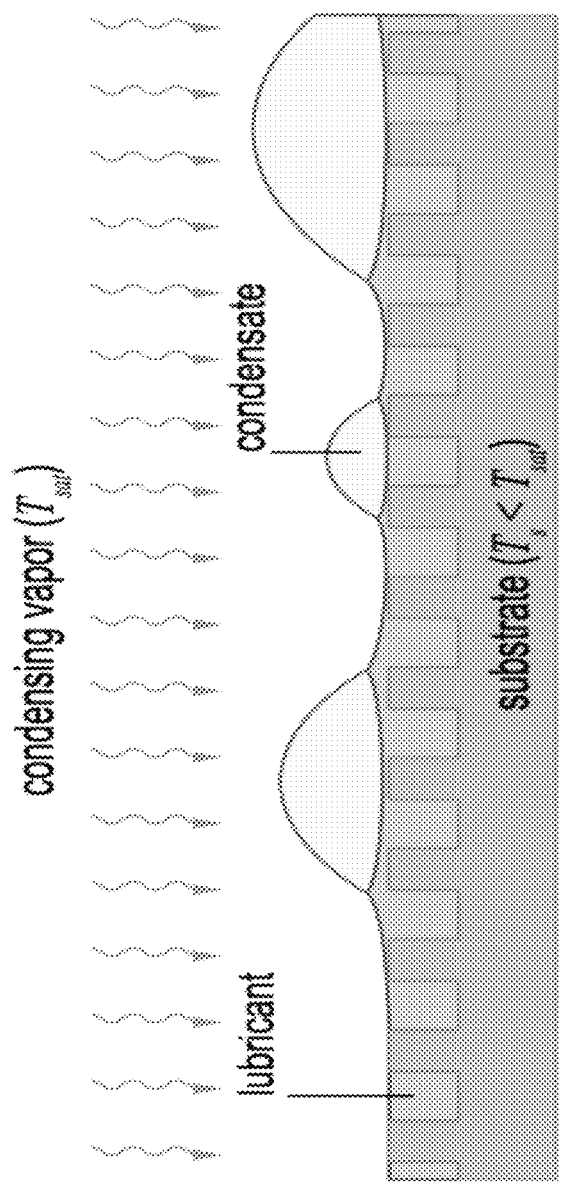
FIG. 1 illustrates a lubricant-impregnated surface, in accordance with certain embodiments of the invention.

It is contemplated that apparatus, articles, methods, and processes of the claimed invention encompass variations and adaptations developed using information from the embodiments described herein. Adaptation and/or modification of the apparatus, articles, methods, and processes described herein may be performed by those of ordinary skill in the relevant art.

Throughout the description, where articles, devices, apparatus and systems are described as having, including, or comprising specific components, or where processes and methods are described as having, including, or comprising specific steps, it is contemplated that, additionally, there are articles, devices, apparatus and systems of the present invention that consist essentially of, or consist of, the recited components, and that there are processes and methods according to the present invention that consist essentially of, or consist of, the recited processing steps.

Similarly, where articles, devices, mixtures, apparatus and compositions are described as having, including, or comprising specific compounds and/or materials, it is contemplated that, additionally, there are articles, devices, mixtures, apparatus and compositions of the present invention that consist essentially of, or consist of, the recited compounds and/or materials.

It should be understood that the order of steps or order for performing certain actions is immaterial so long as the invention remains operable. Moreover, two or more steps or actions may be conducted simultaneously.

The mention herein of any publication, for example, in the Background section, is not an admission that the publication serves as prior art with respect to any of the claims presented herein. The Background section is presented for purposes of clarity and is not meant as a description of prior art with respect to any claim.

In some embodiments, a non-wetting, lubricant-impregnated surface is provided that includes a solid having textures (e.g., posts) that are impregnated with an impregnating lubricant. In general, solid features can be made from or comprise any material suitable for use in accordance with the present invention. In certain embodiments, micro-scale features are used (e.g., from 1 micron to about 100 microns in characteristic dimension). In certain embodiments, nano-scale features are used (e.g., less than 1 micron, e.g., 1 nm to 1 micron).

In some embodiments, the lubricant-impregnated surface is configured such that water droplets contacting the surface are not pinned or impaled on the surface.

Some embodiments of the present invention relate to controlling movement of droplets (or other substances) on solid surfaces using externally applied fields. The external fields in some embodiments are electric forces and/or magnetic forces. Some embodiments relate to using ferrofluid-infused superhydrophobic surfaces for droplet manipulation.

The solid underlying surface is coated with or impregnated with a lubricant, which may be a liquid. Non-wetting surfaces containing micro/nanotextures impregnated with lubricating liquids exhibit superior non-wetting performance, as compared to e.g., superhydrophobic surfaces that rely on stable air-liquid interfaces. The lubricating liquid is stabilized by the capillary forces arising from the microscopic or nanoscopic texture, which allows the droplet to move above the surface with ease, as evidenced by extremely low contact angle hysteresis (~1°) of the droplet. Contact line morphology governs droplet pinning on the surface and the mobility of the droplet on the surface.

Liquid impregnated surfaces are described in U.S. patent application Ser. No. 13/302,356, entitled "Liquid-Impregnated Surfaces, Methods of Making, and Devices Incorporating the Same," filed Nov. 22, 2011, the disclosure of which is hereby incorporated by reference herein in its entirety. Articles and methods that enhance or inhibit droplet shedding from surfaces are described in U.S. patent application Ser. No. 13/495,931, entitled, "Articles and Methods for Modifying Condensation on Surfaces," filed Jun. 13, 2012, the disclosure of which is incorporated by reference herein in its entirety.

In certain embodiments, the impregnating lubricant includes lubricants that exhibit cloaking e.g., in the presence of air or water. In certain embodiments, lubricant cloaking is desirable and is used as a means for preventing environmental contamination, like a time capsule preserving the contents of the cloaked material. Cloaking can result in encasing of the material thereby cutting its access from the environment. This can be used for transporting materials (e.g., bioassays) across a length in a way that the material is not contaminated by the environment.

In certain embodiments, the amount of cloaking can be controlled by various lubricant properties such as viscosity and surface tension. Additionally or alternatively, in some embodiments, the de-wetting of the cloaked material to release the material may be controlled. Thus, in some embodiments, a system is contemplated in which a liquid is dispensed in the lubricating medium at one end, and upon reaching the other end is exposed to environment that causes the lubricant to uncloak.

In some embodiments, the lubricant-impregnated surface is configured such that cloaking by the impregnating liquid can be either eliminated or induced, according to different embodiments described herein.

In some embodiments, the lubricant does not exhibit cloaking. For example, cloaking can cause the progressive loss of impregnating liquid through entrainment in the water droplets as they are shed from the surface, which may be undesirable in some embodiments. In some embodiments, lubricant-impregnated surfaces are engineered to provide resistance to impalement and to provide non-wettability, without requiring replenishment of impregnating fluid to make up for liquid lost to cloaking, and without requiring replenishment of impregnating liquid to maintain coverage over the tops of the solid features.

Without wishing to be bound to any particular theory, impregnating liquids that have $S_{ow(a)}$ (where o is the impregnating liquid, w is water, and a is air) less than 0 will not cloak, resulting in no loss of impregnating liquids, whereas impregnating liquids that have a spreading coefficient of $S_{ow(a)}$ greater than 0 will cloak matter (condensed water droplets, bacterial colonies, solid surface) and this may be exploited to prevent corrosion, fouling, etc. In certain embodiments, cloaking is used for preventing vapor-liquid transformation (e.g., water vapor, metallic vapor, etc.). In certain embodiments, cloaking is used for inhibiting liquid-solid formation (e.g., ice, metal, etc.). In certain embodiments, cloaking is used to make reservoirs for carrying the materials, such that independent cloaked materials can be controlled and directed by external means (like electric or magnetic fields).

In some embodiments, when the motive phase (e.g., liquid droplets) is introduced onto the surface, the motive phase pulls up the impregnated lubricant to the sides of the motive phase (e.g., liquid droplets). In some embodiments, the motive phase is a droplet (or e.g., a stream of droplets); as the droplets are introduced onto the lubricant-impregnated surface, each droplet pulls up the lubricant but the droplet does not become completely cloaked by the lubricant. The pulled-up lubricant at least partially surrounds the motive phase and facilitates the movement of the motive phase (e.g., droplets) on the surface.

In some embodiments, the lubricant does not cloak the motive phase. In some embodiments, the lubricant-impregnated surface includes one or more dynamic regions, each of the one or more dynamic regions including different lubricants or lubricants having different properties (e.g., different levels of saturation magnetization, different viscosity, etc.). In some embodiments, different dynamic regions have different properties. As the motive phase moves through the different dynamic regions, its trajectory and speed may be precisely controlled.

In some embodiments, the different dynamic regions are created by imposing electric and/or magnetic fields in varying patterns which may be temporally and/or spatially varied. In some embodiments, as the motive phase travels on the surface, the strength of the applied electric and/or magnetic fields may be varied (e.g., the strength of the applied field at one location may be different from the strength of the field applied in a different location).

In some embodiments, the impregnating lubricant has a low surface energy.

In order to achieve non-wetted states, it is preferable to have low solid surface energy and low surface energy of the impregnated liquid compared to the non-wetted liquid. For example, surface energies below about 25 $mJ/m^2$ are preferred in some embodiments. Low surface energy liquids include certain hydrocarbon and fluorocarbon-based liquids, for example, silicone oil, perfluorocarbon liquids, perfluorinated vacuum oils (e.g., Krytox 1506 or Fromblin 06/6), fluorinated coolants such as perfluoro-tripentylamine (e.g., FC-70, available from 3M, or FC-43), fluorinated ionic liquids that are immiscible with water, silicone oils comprising PDMS, and fluorinated silicone oils.

Examples of low surface energy solids include the following: silanes terminating in a hydrocarbon chain (such as, e.g., octadecyltrichlorosilane), silanes terminating in a fluorocarbon chain (e.g., fluorosilane), thiols terminating in a hydrocarbon chain (such as e.g., butanethiol), and thiols terminating in a fluorocarbon chain (e.g., perfluorodecane thiol). In certain embodiments, the surface comprises a low surface energy solid such as a fluoropolymer, for example, a silsesquioxane such as fluorodecyl polyhedral oligomeric silsesquioxane. In certain embodiments, the fluoropolymer is (or comprises) tetrafluoroethylene (ETFE), fluorinated ethylenepropylene copolymer (FEP), polyvinylidene fluoride (PVDF), perfluoroalkoxytetrafluoroethylene copolymer (PFA), polytetrafluoroethylene (PTFE), tetrafluoroethylene, perfluoromethylvinylether copolymer (MFA), ethylenechlorotrifluoroethylene copolymer (ECTFE), ethylene-tetrafluoroethylene copolymer (ETFE), perfluoropolyether, or Tecnoflon.

In certain embodiments, an impregnating liquid is or comprises an ionic liquid. Ionic liquids have extremely low vapor pressures (~$10^{-12}$ mmHg), and therefore they mitigate the concern of the lubricant loss through evaporation. Exemplary impregnating liquids include, but are not limited to, tetrachloroethylene (perchloroethylene), phenyl isothiocyanate (phenyl mustard oil), bromobenzene, iodobenzene, o-bromotoluene, alpha-chloronaphthalene, alpha-bromonaphthalene, acetylene tetrabromide, 1-butyl-3-methyl-imidazolium bis(trifluoromethylsulfonyl) imide (BMIm), tribromohydrin (1,2,3-tribromopropane), tetradecane, cyclohexane, ethylene dibromide, carbon disulfide, bromoform, methylene iodide (diiodomethane), stanolax, Squibb's liquid petrolatum, p-bromotoluene, monobromobenzene, perchloroethylene, carbon disulfide, phenyl mustard oil, monoiodobenzene, alpha-monochloro-naphthalene, acetylene tetrabromide, aniline, butyl alcohol, isoamyl alcohol, n-heptyl alcohol, cresol, oleic acid, linoleic acid, amyl phthalate and any combination thereof.

In certain embodiments, the solid features include at least one member selected from the group consisting of a polymeric solid, a ceramic solid, a fluorinated solid, an intermetallic solid, and a composite solid. In certain embodiments, the solid features comprise a chemically modified surface, coated surface, surface with a bonded monolayer, and/or a surface with a covalently bonded layer. In certain embodiments, the solid features define at least one member selected from the group consisting of pores, cavities, wells, interconnected pores, and interconnected cavities. In certain embodiments, the solid features include at least one member selected from the group consisting of posts, nanoneedles, nanograss, substantially spherical particles, and amorphous particles.

In certain embodiments, the lubricant-impregnated surface is configured such that water droplets contacting the surface are not pinned or impaled on the surface and have a roll-off angle α of less than 75°, less than 60°, or less than 40° (e.g., for a 5 microliter droplet). In certain embodiments, the water droplets have a roll-off angle α of less than 25° (e.g., for a 5 microliter droplet).

One embodiment of the present invention relates to the use of externally applied electric fields and other fields to control the movement of both liquid/solid particles on the lubricant-impregnated surfaces. The electric body force $\vec{f}$ in a dielectric liquid, that results from an imposed electric field, $\vec{E}$, can be expressed as:

$$\vec{f} = \rho_c \vec{E} - \frac{1}{2}\vec{E}^2 \nabla \varepsilon + \frac{1}{2}\nabla\left[\vec{E}^2 \rho \left(\frac{\partial \varepsilon}{\partial \rho}\right)_T\right] \quad (1)$$

where $\rho_c$ is volume charge density, ε is the fluid permittivity and ρ is the fluid density, and T is the fluid temperature. The first term $(\rho_c \vec{E})$ on the right hand side of the Eq. (1) is the electrophoretic, or Coulombic, force that results from the net free space charges in the fluid. The second term $$\left(\frac{1}{2}\vec{E}^2 \nabla \varepsilon\right),$$

known as me dielectrophoretic force, arises from the permittivity gradient. The last term $$\left(\frac{1}{2}\nabla\left[\vec{E}^2 \rho \left(\frac{\delta \varepsilon}{\delta \rho}\right)_T\right]\right),$$

called the electrostrictive force, is important only for compressible fluids.

Figure 2:
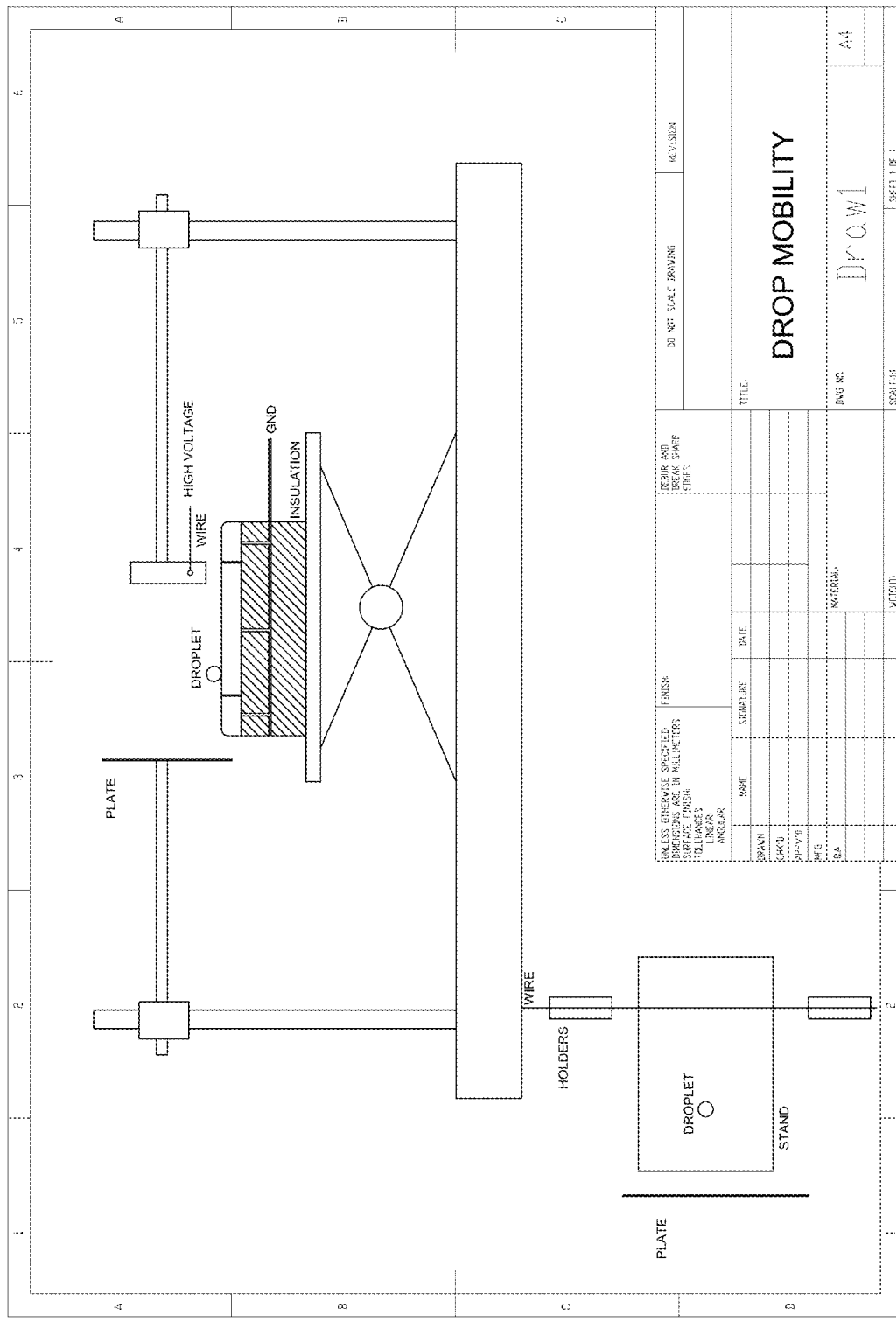
FIG. 2 illustrates an example experimental setup for droplet mobility on a lubricant-impregnated surface, in accordance with certain embodiments of the invention.

FIG. 2 illustrates an example experimental setup for use with electric fields. In some embodiments where the electric field is applied, the dielectrophoretic force is the main driving force when using moderate strength external electric fields. The utilization of a non-uniform electric field on a dielectric object polarizes the object, thus causing the motion of the object. The object may be directed to move in a desired direction and/or along a desired trajectory by modifying the manner of application of the electric field. The speed of movement of the object may be altered as well by modifying the manner of application of the electric field and/or the strength of the electric field.

Figure 3A:
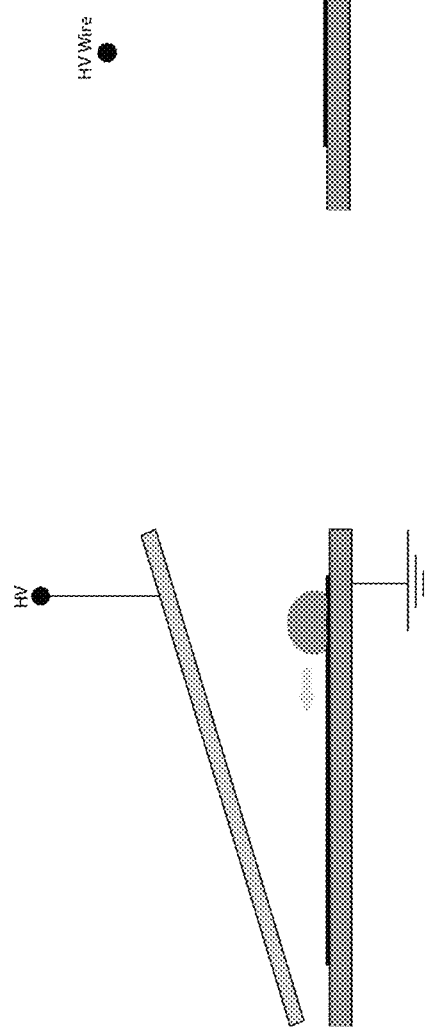
FIG. 3(a) illustrates dielectrophoretic force electrode geometry of a tilted plate electrode (overhead view is shown), in accordance with certain embodiments of the invention.
Figure 3B:
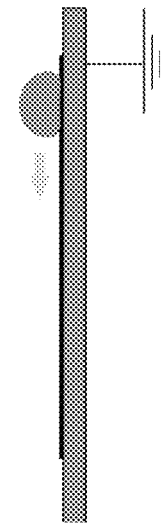
FIG. 3(b) illustrates dielectrophoretic force electrode geometry of a wire electrode, in accordance with certain embodiments of the invention.
Figure 3C:
FIG. 3(c) illustrates dielectrophoretic force electrode geometry of a pin electrode, in accordance with certain embodiments of the invention.
Figure 4A:
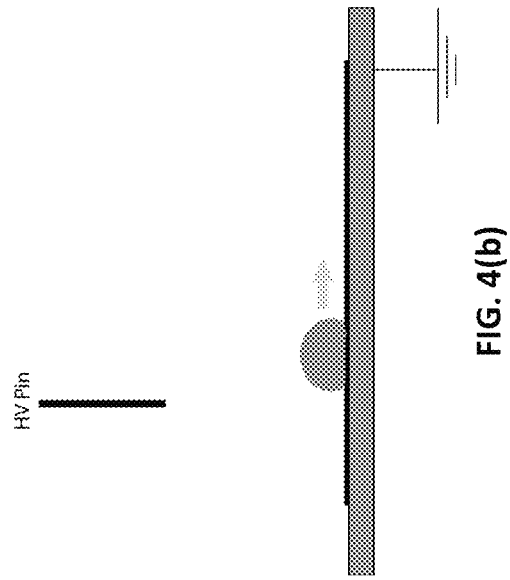
FIG. 4(a) illustrates electrophoretic force electrode geometry of a wire electrode.
Figure 4B:
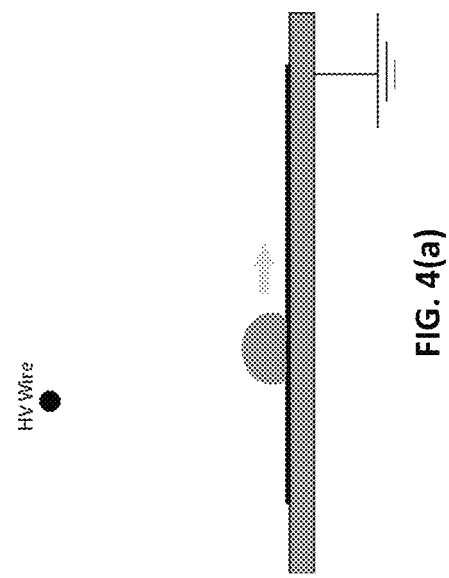
FIG. 4(b) illustrates electrophoretic force electrode geometry of a pin electrode.

Also, by increasing the strength of the external electric field above the corona discharge threshold, one may use electrophoretic force to make the droplet mobile in various directions, as needed. The non-uniform field can be achieved by different electrode geometries, for instance, tilted electrodes, pin-plate, wire-plate, wire-mesh, wire-cylinder, and others. FIG. 3 (dielectrophoretic) and FIG. 4 (electrophoretic) show various electrode geometries and the direction of droplet motion. Images from associated experiments are shown in FIG. 5.

Corona discharge occurs between a sharp electrode, referred to as a corona discharge electrode and a blunt electrode, which may be referred to as a collector electrode. The corona discharge electrode can be a needle, multi-needles with different arrangements, sharp blade or blades, thin wire or multi-wires, wires coated with microstructures, nano-tubes (CNT) or nano-structures, or any other suitable sharp geometries. The corona discharge electrode is preferably constructed from materials that are able to withstand the ionization-induced corrosion, thereby reducing maintenance requirements, and reducing costs. The corona discharge electrode may be fixed in any suitable gaseous medium, including, but not limited to, nitrogen, oxygen, air, argon, helium, or any other gases, at any pressures or temperatures. The collector electrode can be, for example, a metallic bare electrode, a silicon substrate with native oxide, a metallic electrode with dielectric thin film coating, or the like. The geometry of the immersed electrode can be a planar surface, a three-dimensional (contoured) surface, a wire or wires, a mesh, a cylinder, or any other suitable geometry. The potential difference between the corona discharge electrode and the collector electrode (which can be grounded or can be at different potential) can be applied by a high voltage power supply. At and above a corona discharge threshold voltage, by slightly increasing the voltage, a small current can be measured between the electrodes. U.S. Provisional Application Ser. No. 61/812,700, filed Apr. 16, 2013, titled "Systems and Method for Unipolar Emulsion Separation", which is incorporated herein by reference in its entirety, discusses the application of corona discharge threshold for separation of two or more phases of an emulsion.

The force the electric field applies on the material of interest scales with the volume of the object, its effective polarizability, and the gradient in the field. In some embodiments, modifying/tuning these parameters facilitates achieving a large range of droplet velocities for multiple applications. Thus, desired droplet velocities may be achieved depending on the particular needs and application.

Since the particular application (EHD pumps, microfluidic devices etc.) generally will determine the volume of the droplets/materials of interest, the electric field strength can be tuned accordingly to reach necessary or desired flow rates. Certain embodiments of the present invention relate to controlling mobility of droplets of different volumes on the lubricant-impregnated surface. In some embodiments, the volume of each droplet may range between about 0.1-100 μL; 0.1-1 μL; 1-10 μL; 10-20 μL; 20-50 μL; 50-100 μL; 0.1-1000 pL; 1-10 pL; 1-100 pL, or any other suitable volumes.

In certain embodiments, the impregnating liquid comprises a perfluorocarbon liquid, a perfluoro fluorinated vacuum oil (such as Krytox 1506 or Fromblin 06/6), a fluorinated coolant (e.g., perfluoro-tripentylamine sold as FC-70, manufactured by 3M), an ionic liquid, a fluorinated ionic liquid that is immiscible with water, a silicone oil comprising PDMS, a fluorinated silicone oil, a liquid metal, an electro-rheological fluid, a magneto-rheological fluid, a ferrofluid, a dielectric liquid, a hydrocarbon liquid, a fluorocarbon liquid, a refrigerant, a vacuum oil, a phase-change material, a semi-liquid, grease, synovial fluid, and/or a bodily fluid, or any combination thereof.

A further embodiment of the present invention relates to incorporation of magnetic fluids into the lubricant-impregnated surfaces discussed above (ferrofluids). This allows for alteration and precise control of the movement of water droplets via magnetic fields and also makes it possible to actively change the textured surface topology.

Some embodiments discussed herein relate to liquid-solid hybrid surfaces for manipulating free aqueous droplets by utilizing the dynamics of an impregnated super-paramagnetic fluid and a constant non-uniform magnetic field to drive the droplets. Some embodiments of the present invention provide a new platform with applications in the mixing and synthesis of materials, as well as in biological microassays, which will be discussed in further detail below.

Ferrofluids, a colloidal suspension of ferromagnetic nanoparticles (which may be on the order of 10 nm) in a carrier fluid stabilized by a surfactant, have not previously been used for manipulating or controlling the movement of free droplets on surfaces. The surface treatment of the ferromagnetic particles prevents agglomeration of the particles due to short range van der Waals forces, and Brownian motion prevents particle sedimentation in both gravitational and magnetic fields. In some embodiments, the surfactant surface treatment on the particles is stable up to a few years (for example, over 1 year, over 2 years, over 3 years, over 4 years, over 5 years, 1-5 years, etc.).

In the absence of an applied magnetic field, the particles are randomly oriented giving the fluid no net magnetization. However, in the presence of an external magnetic field, ferromagnetic nanoparticles align their magnetic dipole moment parallel to the direction of the applied field and display a strong magnetic interaction. Both paramagnetic and ferromagnetic materials align their magnetic dipole moment parallel to the direction of the applied magnetic field, yet ferromagnetic materials display a strong magnetic interaction between neighboring molecules, while paramagnetic materials display only weak interactions. Ferrofluids typically consist of non-interacting mono-domain magnetic dipoles. The Langevin relation for paramagnetic behavior describes the tendency for the dipole moment to align itself with the applied field, while also introducing the counteracting thermal energy, which acts to randomize the spatial orientation of the dipole moment:

$$\frac{M}{M_s} = L(\alpha) = \coth(\alpha) - \frac{1}{\alpha} \quad (2)$$

$$\alpha = \frac{\mu_0 m H}{k_b T} \quad (3)$$

where M is the magnetization, $M_s$ is the saturation magnetization of the ferrofluid which corresponds to all dipoles being aligned with the field, $\mu_o$ is the permeability of free space, m is the magnetic dipole moment of a particle, H is the applied magnetic field intensity, and $k_b T$ is the thermal energy.

Some conventional systems explored the dynamics and stability of water-based ferrofluid droplets on superhydrophobic surfaces. Some studies utilized ferrofluid to combine droplets, yet involved using it as a continuous phase within microfluidic channels or involved utilizing a magnetic stirrer that introduced disorder and uncontrolled, random mixing of the droplets.

Some embodiments presented herein relate to a superhydrophobic surface including a micropost array with a coating of a silane (e.g., octadecyltrichlorosilane (OTS)) impregnated with a ferrofluid (for example, EMG901, which is an oil-based ferrofluid available from Ferrotec, Inc.). In some embodiments, oil-based ferrofluids are used. In some embodiments, water-based ferrofluids are used.

Any ferrofluids might be used, including, but not limited to, oil-based ferrofluids having saturation magnetization of 990 Gauss (99 mT), 660 Gauss (66 mT), 440 Gauss (44 mT), 220 Gauss (22 mT), 110 Gauss (11 mT) may be used. Ferrofluids having a saturation magnetization between any of the values mentioned above may be used in some embodiments as well. In some embodiments, oil-based ferrofluids including between 3-15% by volume magnetite may be used. In some embodiments, oil-based ferrofluids including between 3-15% by volume magnetite, 6-30% by volume oil soluble dispersant, and 55-91% by volume carrier fluid may be used.

In some embodiments, water-based ferrofluids having a saturation magnetization of 325 Gauss (32.5 mT), 275 Gauss (27.5 mT), 110 Gauss (11 mT), 66 Gauss (6.6 mT), 33 Gauss (3.3 mT). Water-based ferrofluids having a saturation magnetization between any of the values mentioned above may be used in some embodiments as well. In some embodiments, water-based ferrofluids have between 0.4-1.1% by volume magnetite, between 1-4% by volume magnetite, or between 1-8% by volume magnetite. In some embodiments, water-based ferrofluids include between 0.4-1.1% by volume magnetite, 0.5-1.5% by volume water-soluble dispersant, and 97.4-99.1% by volume water. In some embodiments, water-based ferrofluids include between 1-4% by volume magnetite, 6-22% by volume water-soluble dispersant, and 74-93% by volume water. In some embodiments, water-based ferrofluids include between 1-4% by volume magnetite, 7-27% by volume water-soluble dispersant, and 69-92% by volume water. In some embodiments, water-based ferrofluids include between 1-8% by volume magnetite, 6-60% by volume water-soluble dispersant, and 32-93% by volume water. In some embodiments, the percent by volume of magnetite, water-soluble dispersant, and water is between any of the values listed above.

In some embodiments, the ferrofluids are selected based on a desired concentration of magnetic particles (e.g., ferrofluids with higher concentration of magnetic particles are selected if a stronger magnetic response is desired) and/or based on desired composition of the carrier fluid (e.g., oil, water). The impregnated fluid provides the ability to actively manipulate the movement, including the trajectory of movement, of free droplets placed on a surface in several ways.

In some embodiments, an impregnated ferrofluid provides active manipulation for free droplets placed on the surface in several ways. In some embodiments, the thermodynamically stable states of a droplet on a lubricant-impregnated surface have been shown to depend on both the relative spreading coefficients of the lubricant and droplet, as well as the texture geometry. In some embodiments, a microtextured surface lends itself to a critical contact angle below which the lubricant (e.g., ferrofluid) successfully impregnates the texture and remains stably held by capillary forces. The lubricant (e.g., ferrofluid) will impregnate a textured surface if $\theta_{os(v)} \leq \theta_c$ where $\theta_{os(v)}$ is the contact angle of the lubricant (e.g., ferrofluid) "o" on the smooth solid "s" in the presence of air-vapor "v", and $\theta_c$ is the critical contact angle for impregnation, provided by $$\theta_c = \cos^{-1}[(1-\phi)/(r-\phi)] \quad (4)$$

Here, $\phi$ is the fraction of the projected area of the textured surface that is occupied by a solid, and r is the ratio of total surface area of the textured surface to its projected area. In some embodiments, a drop of ferrofluid (e.g., EMG901) on a flat silicon substrate treated with octadecyltrichlorosilane exhibited a contact angle of approximately 20°, which confirms impregnation since θc was calculated to be 65° for the sample used.

The thermodynamically stable state of a lubricant impregnated in a rough solid surface depends on both the relative surface tensions of the two fluids, as well as the texture geometry as discussed in Smith et al., *Soft Matter* 2013, 9, 1772, which is incorporated by reference herein in its entirety. A microtextured surface lends itself to a critical contact angle below which the oil will successfully impregnate the texture and remain stably held in place by capillary forces.

In the case of a surface impregnated with a ferrofluid, this required a contact angle of approximately 65° based on the fraction of projected area of the surface that is occupied by solid and the ratio of the total surface area to the projected area. The contact angle varies based on a number of different factors, including surface roughness. In some embodiments discussed herein, a drop of ferrofluid on a flat silicon substrate treated with OTS exhibited a contact angle of approximately 20°, confirming impregnation.

Some embodiments described herein relate to the ability to control droplets remotely with high precision and without being constrained by path geometries (e.g., without relation to path geometries). One of the advantages of such a system is the ability to operate without an external power source. Another advantage is that no particles are injected into actual mixtures of interest, since the fluids are immiscible.

Commercial Applications

The embodiments described herein are applicable for a variety of practical applications where the ability to control the movement of droplets (e.g., remotely) is significant. Being able to remotely control the movement (including speed, direction, and precise trajectory of movement) of liquid droplets provides a new technique to e.g., microfluidics and lab-on-chip type applications. In some embodiments, droplets of different chemicals/compositions could be remotely mixed in microreactor-on-chip applications. In some embodiments, droplets encapsulating e.g., biological matter (e.g., DNA, RNA) are directed to travel along very precise paths, and at precise speeds.

In some embodiments, the present invention may be used in oil/gas applications for flow assurance in pipes and/or valves. In some embodiments, the present invention may be used in oil/gas applications to prevent buildup of material (e.g., oil) on the surface of the pipes, thereby reducing maintenance and cleaning requirements. Some embodiments of the present invention are useful in preventing and/or reducing hydrate/scale formation and reducing hydrodynamic drag. Some embodiments of the present invention are useful in a wide variety of industries, including, but not limited to, in pharmaceutical and/or drug delivery applications, for power electronics cooling, condensers (e.g., for surfaces of condensers), boiling (e.g., heat exchanger surfaces), anti-icing (e.g., for wind turbines, aviation, power lines, etc.), medical devices (e.g., to keep medical devices clean and to reduce/prevent buildup of material on surfaces of the medical devices). Some embodiments of the present invention significantly reduce or eliminate the cleaning and maintenance needs for a wide variety of applications, including applications where buildup of materials on surfaces is a concern (e.g., buildup of scale and/or hydrates).

According to some embodiments, the present invention may be used in microfluidic and/or bio-related applications. For example, nano- or picoliter-sized droplets can encapsulate biology (e.g., DNA or RNA) where single-plex polymerase chain reactions (PCRs) are performed in each droplet, and the droplets are transported for sorting, detection, combination with other droplets, etc. The volume of each droplet may range between, e.g., 0.1-1000 pL; 1-10 pL; 1-100 pL, or any other suitable volume for bio-related applications.

The present invention may also be used in continuous-flow microfluidics, digital microfluidics, DNA chips, molecular biology applications, study of evolutionary biology study of microbial behavior, cellular biophysics, optofluidics, fuel cell applications, acoustic droplet ejection, and all other suitable microfluidic applications. Some embodiments of the present invention may be used for enzymatic analysis, DNA analysis, and molecular biology applications (e.g., various electrophoresis and liquid chromatography applications for proteins and DNA, cell separation, including separation of blood cells, cell manipulation and analysis, including cell viability analysis). In some embodiments, controlled combination of small droplets could be used for DNA sequencing and the combination of biological matter.

The ability to control the movement of droplets remotely enables the creation of self-cleaning systems which require no or negligible maintenance. In stark contrast, conventional methods require routine cleaning and maintenance of underlying surfaces, assemblies, etc., which is both costly and inconvenient. For some applications, the need for routine cleaning impedes widespread use of certain technologies or impedes the use of such technologies to their full possible capacity. In some embodiments, the present invention may be used with solar panel to enable routine cleaning of these solar panels, which prevents buildup of e.g., dust and other undesirable materials on top of these solar panels, thus preventing these undesirable materials from covering the solar panels and thus interfering the full capacity of the solar panels (e.g., decreasing the energy output from these solar panels).

The present invention may also be used in pharmaceutical and drug-related applications to carry out in-situ chemical reactions. Two flowing substances (or e.g., streams or arrays of droplets) may then be introduced into opposing points (e.g., opposing corners of a substantially V-shaped or V-shaped channel), and the two flowing substances may be configured to travel towards a central or merging point (e.g., an apex of the substantially V-shaped channel) to merge, mix, and to then be transported to a desired location. Embodiments of the present invention may be used to precisely control the speed and/or movement trajectory of each flowing substance or droplet, such that the situs and the time of the reaction is precisely regulated, if necessary.

Some embodiments described herein relate to producing a novel design structure for electrohydrodynamic (EHD) pumps. In some embodiments, conducting liquids can be transported as well using the setups described herein. Conventional EHD pump methods are limited to the type of liquid that is being translated; yet embodiments of the present invention relate to transporting highly conducting liquids. As such, some embodiments of the present invention relate to a wide variety of uses and applications, including implementing lubricant-impregnated surfaces into EHD pumps as a means to control the movement of droplets and other motive phases of non-conducting and conducting liquids for various applications.

Lubricant-impregnated surfaces also can be fabricated by creating micro-fibers that are a result of etching away at a solid material such as plastics and copper wires. These wires can then also be infused with lubricants, thus giving them super slippery features. Electric fields can then be applied to move droplets along these slippery fibers in the same manner as discussed above (e.g., for embodiments using magnetic forces).

Some embodiments for inducing droplet mobility described herein may also be employed in large-scale power generation systems such as condensers. These systems rely on droplets easily shedding from the inner surfaces such that the heat transfer remains efficient, and embodiments described herein may be used to improve or facilitate shedding of droplets. Articles and methods that enhance or inhibit droplet shedding from surfaces are described in U.S. patent application Ser. No. 13/495,931, entitled, "Articles and Methods for Modifying Condensation on Surfaces,"

filed Jun. 13, 2012, the disclosure of which is incorporated by reference herein in its entirety.

Several energy systems require self-cleaning surfaces as well, such as solar panels. Droplets and particles/dust on these optically intense systems diffract the sun's light, thus causing sharp decreases in efficiency. Solar panels are typically positioned outdoors, in areas not protected from the elements, such as rain and dust. Embodiments described herein may be employed to help alleviate the problem of buildup of droplets, particles, dust, as well as other materials on the surfaces of these solar panels. For solar panels, a lubricant-impregnated surface could be incorporated into solar panels (e.g., on top of the solar panel surface) by using a lubricant and a textured surface to combine into a composite solid that would regain optical transparency. In other words, the properties of the lubricant-impregnated surface are such that the incorporation of the lubricant into the solar panel surface would not interfere with the optical properties of the solar panel, such that the solar panel would perform in the same way as it would without the lubricant-impregnated surface. In some embodiments, a textured surface is etched in or on a surface of a transparent solid (e.g., solar panel surface) via any known method (e.g., mechanical etching, laser etching, chemical etching, etc.); this step turns the surface opaque as the light diffracts off the corners of texture. The textured surface is then impregnated with a fluid or liquid (or other suitable substance) that has the same index of refraction as the solid surface, which allows the solid surface to regain the same transparency.

The present invention may be used in a wide variety of applications, including windows, mirrors, and other similar slippery surfaces which require routine maintenance and cleaning. For these applications, self-cleaning properties would drastically reduce the maintenance and cleaning needs and would ensure that these surfaces always remain clean. The ability to use electric fields to control droplet mobility and to easily transport droplets on slippery surfaces is advantageous for a wide array of different applications, as discussed above. Most conventional systems and methods cannot successfully move conductive liquids on or across slippery surfaces.

EXPERIMENTAL EXAMPLES

Materials and Methods

Ferrotec EMG 901 ferrofluid was used for ferrofluid, which includes nominal magnetite particle diameter of 10 nanometers at concentration of 11.8% volume. The ferrofluid has a saturation magnetization of 660 Gauss and a viscosity of 8 cP at 27° C.

Figure 6:
FIG. 6 illustrates a droplet accelerating to the left. Tilted electrode geometry is illustrated above the droplet as it accelerates to the region of increasing field strength.

K&J Magnetics 3 mm radius cylindrical neodymium permanent magnet (Grade N52) were used as permanent magnets Electric Field Experiments For both FIGS. 5 and 6, the samples that were used were identical. Silicon wafers were textured using typical cleanroom photolithography and RIE (reactive-ion etching). Once the samples were textured, they were coated with a low surface energy silane (octadecyltrichlorosilane (OTS)) which rendered the surface hydrophobic and preferentially wetted by oil. OTS exhibits an advancing water contact angle of 110±4° on a smooth surface. The samples were impregnated using a careful dip coating technique at a controlled rate such that there was no excess oil. The oil used in both FIGS. 5 and 6 was 10 cSt silicone oil. In FIG. 5, the setup used was the pin electrode setup (an example of this setup us shown in FIGS. 3 and 4), and the tilted plate electrode setup was used in FIG. 6.

The present experimental setups demonstrated the ability to achieve significant velocities—in the cm/s range—with droplets having diameters in the millimeter range.

FIG. 6 shows a 20-microliter droplet accelerating through the non-uniform electric field to the area of increasing field strength. A voltage of ~2 kV was applied to the upper electrode, and the mean electric field was approximately $3 \times 10^5$ V/m. A negligible current (on the order of picoamps) was recorded, which means the power consumption of the electrode setup was close to zero which is another significant advantage of the present setup.

Also shown in FIG. 7, is an experiment in which the same electrode setup (as that shown in FIG. 6) is used on a droplet resting on a typical superhydrophobic surface. The voltage of the upper electrode was steadily increased to determine whether the droplet would experience translation to the region of increasing field strength. As shown in the images of FIG. 7, the droplet only slightly deformed in the direction of the upper electrode, and then electrical breakdown caused the droplet to retain its original position, and to then oscillate back and forth.

Very high voltages were attempted (around 6 or 7 kV), and the droplets were still unable to translate, which further demonstrates the advantage of the extremely slippery nature of the lubricant-impregnated surfaces. Thus, embodiments of the present invention may be employed to maintain or preserve a position of substances (e.g., droplets) on top of surfaces. This may be useful in a variety of applications, including applications directed to preventing flowing substances from reaching certain areas (e.g., to keep droplets of fluid from moving to areas that should be kept dry) or to maintain flowing substances stationary at certain locations for a desired time period (e.g., to achieve precise timing of reactions or to achieve precise mixing conditions).

Magnetic Field Experiments

Fabrication of Surfaces

Square microposts were etched in silicon using a standard photolithography process followed by deep reactive ion etching. Each post had a width, height, and edge-to-edge spacing of 10 μm. The samples were then cleaned in a Piranha solution and treated with a low-energy silane (octadecyltrichlorosilane (OTS)) by solution deposition. The samples were infused with ferrofluid by dip coating followed by nitrogen gas purging to remove any excess fluid not held by capillary forces. Other suitable methods to infuse the ferrofluid may be used as well as discussed, for example in Smith et al., "Droplet Mobility on Lubricant-Impregnated Surfaces," *Soft Matter* 2013, 9, 1772, (Appendix B). Any suitable methods that are suitable for impregnating a lubricant into the surface may be used to infuse the ferrofluid.

The ferrofluid used was EMG901, which is an oil-based ferrofluid available from Ferrotec, Inc. The ferrofluid had a surface tension of 22 dyne/cm; interfacial tension with water of 32 dyne/cm, a viscosity of 8 cP (8 mPa·5), a density of 1.43 g/cm$^3$, a saturation magnetization of 660 Gauss (66 mT), a magnetic susceptibility of 6.79 in SI units. The concentration of magnetic particles was 11.8% by volume.

Droplet Orientation-Angle Experiments

A 10 μl droplet was deposited on one of the surfaces prepared as described above. A cylindrical magnet (available from K&J Magnetics) of a radius of 3 mm was slowly approached to the droplet at several different angles relative to the droplet vertical centerline. Droplet deformation was then analyzed using ImageJ software analysis.

Figure 8A:
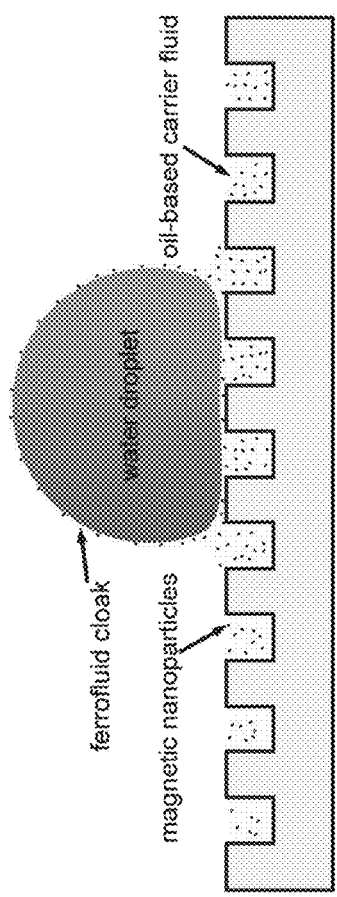
FIGS. 8(a)-(e) illustrate a system of a ferrofluid-infused superhydrophobic surface according to embodiments of the present invention.
Figure 8B:
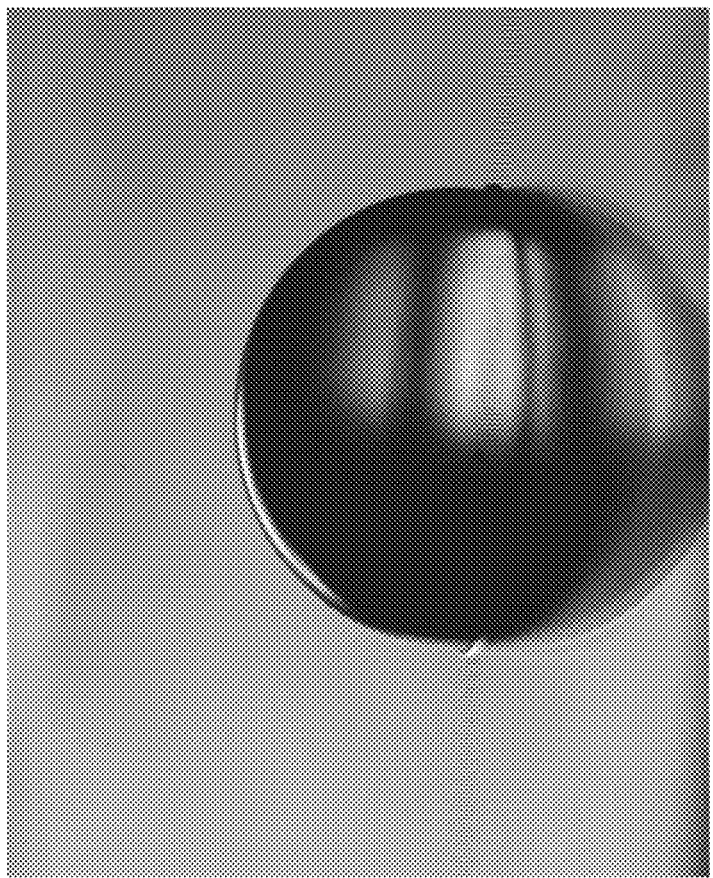

Referring now to FIG. 8(a), it is shown that a system including a water droplet on this impregnated surface is in a state in which a thin layer of lubricant cloaks the water droplet, which is due to the positive spreading coefficient of the ferrofluid on water. FIG. 8(a) shows a liquid-solid composite surface that utilizes a spatially non-uniform magnetic field to drive the droplets. Diamagnetic liquids (e.g., water) may be transported on the surface shown in FIG. 8(a) with relatively small magnetic fields of permanent magnets. The oil based ferrofluid is immiscible with water, thus allowing for the droplet to rest on the surface with a ferrofluid cloak stably. As seen in FIG. 8(a), the magnetic nanoparticles are distributed throughout the cloak that encapsulates the droplet. As shown FIG. 8(b), when the spreading coefficient of the ferrofluid on water in the presence of vapor is positive, the ferrofluid will spread on the droplet, i.e., $S_{ow(v)} \geq 0$, where $S_{ow(v)} = \gamma_{wv} - \gamma_{ov} - \gamma_{ow}$ and $\gamma_{wv}$, $\gamma_{ov}$, $\gamma_{ow}$ are the respective interfacial tensions of the water-air, ferrofluid-air, and ferrofluid-water interfaces.

Since the contact angle of the ferrofluid on the solid in the presence of water was measured to be zero, $\theta_{os(w)} = 0°$, $S_{ow(v)} \geq 0$, the ferrofluid will fully spread on the micropost tops beneath a water droplet, thus leading to virtually no droplet pinning. This results in extremely low contact-angle hysteresis)(~1°) and high droplet mobility.

Figure 8E:
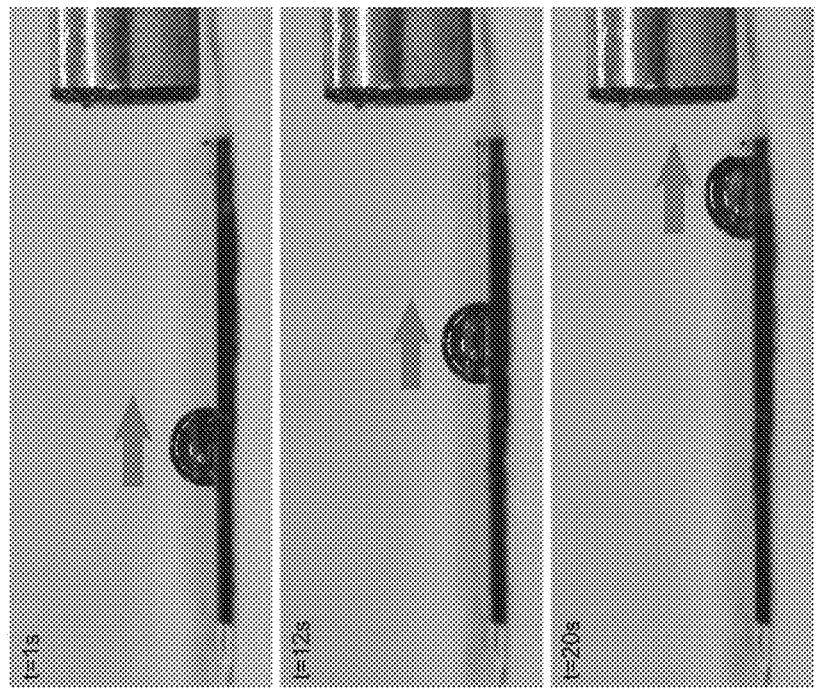
Figure 8C:
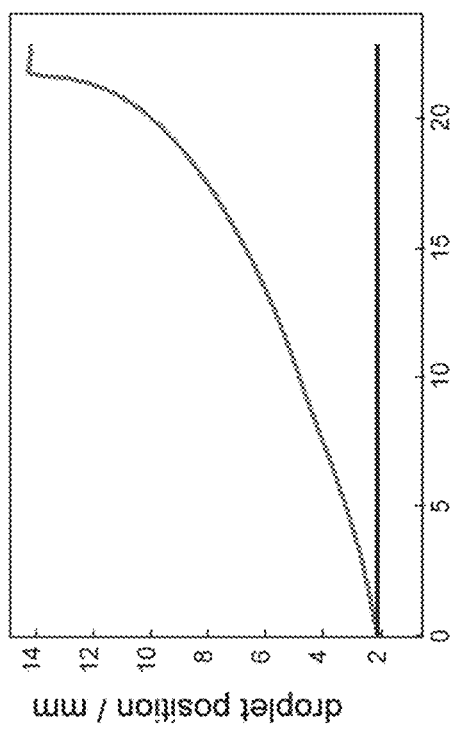
Figure 8D:
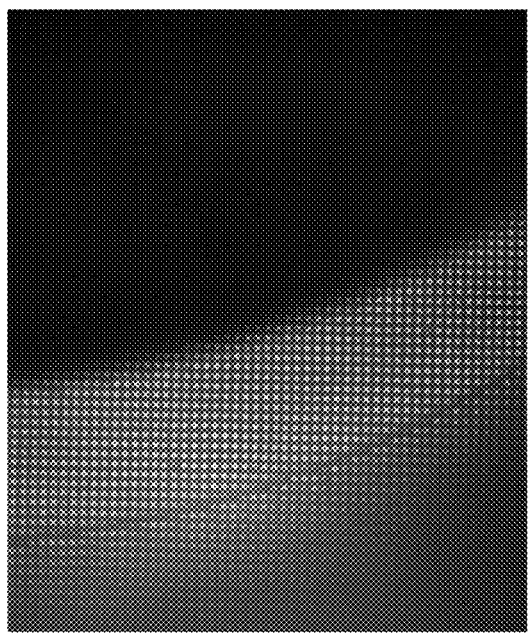

Approaching a cylindrical permanent magnet (available from K&J Magnetics) to the surface and droplet attracts the magnetic particles to the region of highest magnetic field intensity, along the centerline of the nearest magnetic pole, as shown in FIG. 8(e). The droplet position versus time was tracked and recorded in FIG. 8(c), which shows that the droplet accelerates towards the region of highest magnetic field. Macroscopically, this acts to distort the ferrofluid-air interface towards the magnet, which arises in a variety of ferrofluid responses that depend heavily on field strength and distribution. The super-paramagnetic cloak offers a unique mechanism for droplet propulsion, as illustrated in FIG. 8(d). FIG. 8(d) is a microscope image of a droplet translating across the surface (the droplet was in motion at time of capture).

FIGS. 9(a)-9(c) show the effects of approaching a magnet to the surface of a droplet placed on a surface according to one embodiment of the present invention.

When moving the magnet sufficiently close to the surface of the droplet, the magnetic attraction of the cloaked particles dominates. First, the magnet was moved symmetrically above the droplet. The droplet can be seen to deform toward the magnet, as shown in FIG. 9(a), and the magnetic particles move and crowd on the droplet surface nearest to the magnet to form local cone-like structures. The attraction of the particles is balanced by the cloak-air interfacial tension, which stabilizes the particles within the fluid (e.g., such that the magnetic particles are not extracted from the fluid). This resistance allows the magnetic force to physically deform the entire water droplet. The magnetic attractive force is locally balanced by restoring interfacial forces that act to hold these particles in the cloak. In this symmetric configuration, the droplet remains stationary, as there is no net horizontal force on the droplet. However, when the magnet is in an asymmetric configuration, the droplet both distorts and translates towards the region of higher magnetic field, as shown in FIG. 9(b). As shown schematically in FIG. 9(b), the cone-like structures are seen to orient along the direction of the maximum field intensity (along the centerline of the magnet), which explains the droplet distortion in the same direction.

Several experiments were performed where the magnet was approached to the droplet at different angles. Regardless of the angle at which the magnet was approached to the magnetic particle, the magnetic particles concentrated on the droplet surface closest to the magnet, and the droplet translated in the direction of the magnet. Distortion of the droplet, $\theta_{dropletorientation}$ for various magnet orientations $\theta_{magnet}$ was measured, and the droplet was observed to deform at an angle that aligns with the center of the magnet surface. The graph showing the relationship between the angle that the magnet is approached ($\theta_{magnet}$) and the droplet deformation angle ($\theta_{dropletorientation}$) is shown in FIG. 9(c). This asymmetric interaction results in a net horizontal force on the droplet, which serves to propel the drops. As shown in FIGS. 9(a)-(c), utilizing the cloaked film according to some embodiments presented herein offers a new method of distorting and propelling droplets according to desired trajectories.

Jetting Experiments

A 10 μl droplet was deposited on one of the surfaces prepared as described above. A cylindrical magnet (available from K&J Magnetics) of a radius of 3 mm was slowly lowered directly over the droplet using a x-y controlled stage. The droplet height and magnet distance from the unperturbed interface were tracked using ImageJ software analysis as the attraction between the magnet and the droplet began to deform the droplet towards the magnet. A high-speed camera was used to capture the jetting phenomena (Photron SA1).

Cloaked droplets continue to deform along with the ferrofluid until the magnet reaches a critical distance at which the magnetic attractive force of the particles is greater than the interfacial stability that is holding the particles in the cloak. The particles then physically detach from the film and agglomerate on the surface of the magnet, thus marking the onset of "jetting" transition.

After this transition, the magnetic particles from liquid jet and detach from the clumped region of the cloak. FIG. 10(a) illustrates this occurrence; in FIG. 10(a), the cloaked film demonstrated this transition at a critical magnet distance. As the particles jet from the cloak, the droplet height of deformation begins to oscillate due to the continuous forming and detaching of liquid jets. As shown in high-speed images presented in FIG. 10(b), the jets form high aspect ratio geometries, indicating that the characteristic speed of these jetting events is extremely high. The moment when the jetting transition occurs may be calculated. The natural scaling for the interfacial deflection of the ferrofluid is calculated using the following Equation:

$$h_c^2 = \frac{\mu_0 \chi M^2 R_m^6 V}{18 \pi \gamma d^6} \qquad (5)$$

where $h_c$=O ($10^{-3}$ m) is a characteristic interfacial deflection, $\mu_o$=1.257×$10^{-6}$ m kg $s^{-2}$ $A^2$ is the permeability of free space, magnetic susceptibility $\chi$ =6.79, permanent magnet magnetization M=O ($10^6$ A/m), radius of magnet $R_m$=3×$10^-$³m, characteristic volume of clumped particle area V=O ($10^{-10}$ m³), interfacial tension γ=0.022 N/m, and magnet distance from unperturbed interface d. Solving Eq. (5) for d and utilizing the values above for the other variables, a critical magnet distance of d=O ($10^{-2}$m) may be predicted for the jetting transition to occur, which was observed experimentally. The droplet height was recorded as the distance between the magnet and the droplet was decreased, and the droplet height is graphically displayed in FIG. 10(c). Two different regimes in the droplet deformation were found as shown in the plot. In some embodiments, when the distance between the magnet and the droplet is larger than the critical jetting length, the droplet deforms smoothly and reaches an equilibrium deformation. In some embodiments, when the distance between the magnet and the droplet is shorter, the particles begin to jet from the cloak, and the droplet height or deformation begins to oscillate due to the continuous forming and detaching of liquid jets.

Coalescing of Two Droplets Experiment

Figure 11A:
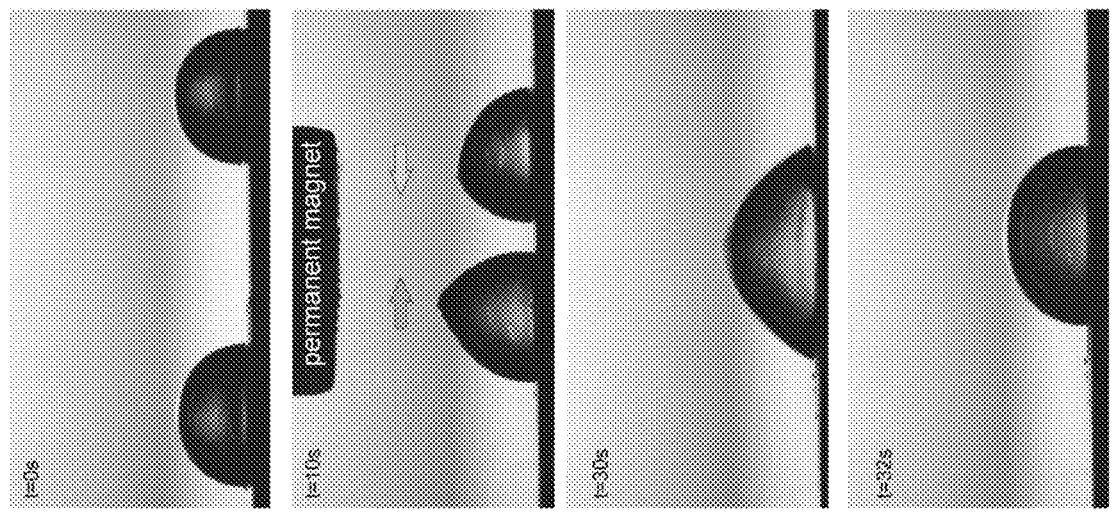
FIG. 11(a) illustrates the behavior of two water droplets (different dyes were used to separate the droplets and observe their mixing) placed on a ferrofluid-infused surface, according to some embodiments of the present invention. A magnet was lowered vertically directly between the droplets, which caused the two droplets to move forward toward one another as shown at t=10 s in FIG. 11(a). Coalescence of droplets occurred at t=30 s in FIG. 11(a), and was captured immediately before the full mixing of the droplets, which occurred at t=32 s, as shown in FIG. 11(a).

Two 10 µl droplet with two different colored dyes were deposited on one of the surfaces prepared as described above. A cylindrical magnet (available from K&J Magnetics) was lowered vertically directly between the droplets, which caused the two droplets to move forward toward one another as shown in FIG. 11(a). Introducing a magnet between two droplets is sufficient to combine the droplets as shown in FIG. 11(a). The region of highest magnetic field intensity, which is located directly beneath the magnet in FIG. 11(a), attracts both droplets to center under the magnet. The magnetic attraction was strong enough to overcome any interfacial stabilizing force caused by the surfactant in the ferrofluid cloak, ultimately leading to coalescence of the two droplets.

The region of highest magnetic field intensity, directly beneath the magnet, attracts both droplets to center under the magnet, leading to coalescence. Additionally, the motion of conductive liquids (1M NaCl aqueous solution) and highly viscous dielectric liquids (100% glycerol) was achieved and displayed in FIG. 11(b). The manipulation of low surface tension fluids can be achieved with this method utilizing the appropriate immiscible lubricant (or a combination of appropriate lubricants).

In some embodiments, the surfaces discussed herein, along with magnets, can also be used for manipulating solid objects on surfaces. As demonstrated in FIG. 11(b), a 5 mm glass bead is translated on the surface using a permanent magnet.

In some embodiments, for lab-on-a-chip applications, pre-fabricated microfluidic channels or embedded electrodes can be used to move and mix droplets along complex paths, as this surface's (e.g., ferrofluid-impregnated textured surface) droplet actuation mechanism naturally does not have constraints on path geometries (FIG. 11(c)). Therefore, ferrofluid-impregnated surfaces provide a framework for free surface manipulation of a broad range of liquids with various physicochemical, electrical, and magnetic properties.

EQUIVALENTS

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A method for controlling movement of a motive phase on a liquid-impregnated surface, the method comprising:
    providing a liquid-impregnated surface, said surface comprising an impregnating liquid and a matrix of solid features spaced sufficiently close to contain the impregnating liquid therebetween or therewithin;
    introducing the motive phase onto the surface wherein introducing the motive phase onto the surface comprises allowing the motive phase to form on the surface, the motive phase comprising a phase that is immiscible with the impregnating liquid; and
    exposing the motive phase to an electric field and/or a magnetic field to induce controlled movement of the motive phase on the surface.

2. The method of claim 1, further comprising applying a non-uniform electric field to induce the controlled movement of the motive phase on the surface.

3. The method of claim 1, further comprising applying an non-uniform magnetic field to induce the controlled movement of the motive phase on the surface and wherein the the motive phase is cloaked by the impregnating liquid.

4. The method of claim 1, wherein the impregnating liquid comprises a member selected from the group consisting of silicone oil, a perfluorocarbon liquid, a fluorinated coolant, an ionic liquid, a liquid metal, an electro-rheological fluid, a magneto-rheological fluid, a ferrofluid, a dielectric liquid, a hydrocarbon liquid, a fluorocarbon liquid, a refrigerant, a vacuum oil, a phase-change material, a semi-liquid, grease, synovial fluid, bodily fluid, or any combination thereof.

5. The method of claim 1, wherein the motive phase is liquid droplets.

6. The method of claim 5, wherein the liquid-impregnated surface is a surface of a condenser, wherein the liquid droplets comprise a condensing liquid, and wherein the controlled movement of the liquid droplets on the surface enhances shedding of the condensing liquid, thereby enhancing efficiency of heat transfer provided by the condenser.

7. The method of claim 1, wherein the liquid-impregnated surface is a surface of a solar panel, wherein the motive phase comprises dust particles, and wherein the controlled movement of the motive phase on the surface effectively removes the dust particles from the solar panel.

8. The method of claim 7, wherein the solar panel self-generates sufficient energy to provide the electric field to induce controlled movement of the motive phase on the surface.

9. The method of claim 1, wherein the motive phase comprises biological material.

10. The method of claim 1, wherein the motive phase is ice and wherein exposing the ice to the electric and/or the magnetic field induces controlled movement of the ice on the surface to de-ice the surface.

11. The method of claim 1, wherein the surface is a surface of a vessel and wherein the motive phase is oil or gas in contact with the surface.

12. The method of claim 11, wherein exposing the oil or gas to the electric and/or the magnetic field induces the oil or gas to move in a controlled manner and/or to prevent buildup of the oil or gas on the surface of the vessel.

13. The method of claim 1, wherein exposing the motive phase to the electric and/or the magnetic field induces inhibition of hydrate adhesion upon the surface.

14. The method of claim 1, wherein exposing the motive phase to the electric and/or the magnetic field comprises reducing an amount of scale buildup formed on the surface.

15. The method of claim 1, wherein exposing the motive phase to the electric and/or the magnetic field induces the motive phase to move.

16. The method of claim 1, wherein the liquid-impregnated surface is a microchannel of an electrohydrodynamic pump.

17. The method of claim 1, wherein $\phi=0$, where $\phi$ is a representative fraction of the projected surface area of the liquid-impregnated surface to non-submerged by the impregnating liquid at equilibrium.

18. The method of claim 1, wherein one or both of the following holds:
(i) $0<\phi \leq 0.25$, where $\phi$ is a representative fraction of the projected surface area of the liquid-impregnated surface non-submerged by the impregnating liquid at equilibrium; and
(ii) $S_{ow(a)}<0$, where $S_{ow(a)}$ is spreading coefficient, defined as $\gamma_{wa}-\gamma_{wo}-\gamma_{oa}$, where $\gamma$ is the interfacial tension between the two phases designated by subscripts w, a, and o, where w is the liquid of the liquid droplets, a is surrounding gas, and o is the impregnating liquid.

19. The method of claim 1, wherein the impregnating liquid entirely cloaks the motive phase.

20. The method of claim 1, wherein the impregnating liquid does not cloak the motive phase.

21. The method of claim 1, wherein the impregnating liquid forms pulled-up regions around the motive phase to induce movement of the motive phase.

22. The method of claim 1, further comprising replenishing a supply of the impregnating liquid.

23. The method of claim 1, wherein the surface is microtextured.

24. The method of claim 1, wherein the solid features comprise at least one member selected from the group consisting of a polymeric solid, a ceramic solid, a fluorinated solid, an intermetallic solid, and a composite solid.

25. The method of claim 1, wherein the solid features comprise a chemically modified surface, a coated surface, and/or a surface with a bonded monolayer.

26. The method of claim 1, wherein the solid features comprise at least one member selected from the group consisting of posts, nanoneedles, nanograss, substantially spherical particles, and amorphous particles.

* * * * *